(12) United States Patent
Ayatsuka

(10) Patent No.: US 7,857,232 B2
(45) Date of Patent: Dec. 28, 2010

(54) TWO-DIMENSIONAL BAR CODE, INFORMATION PROCESSING DEVICE, INFORMATION PROCESSING METHOD, AND PROGRAM

(75) Inventor: Yuji Ayatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 858 days.

(21) Appl. No.: 11/642,205

(22) Filed: Dec. 20, 2006

(65) Prior Publication Data

US 2007/0145141 A1 Jun. 28, 2007

(30) Foreign Application Priority Data

Dec. 22, 2005 (JP) ............... 2005-369197

(51) Int. Cl.
*G06K 19/06* (2006.01)
(52) U.S. Cl. ............... 235/494; 235/462.09; 235/462.1; 235/462.11
(58) Field of Classification Search ................. 235/375, 235/435, 454, 462.01, 462.09–462.16, 462.23, 235/462.24, 487, 494
See application file for complete search history.

(56) References Cited

U.S. PATENT DOCUMENTS

| | | | |
|---|---|---|---|
| 5,477,045 A * | 12/1995 | Priddy et al. ................. 235/494 |
| 5,591,956 A * | 1/1997 | Longacre et al. .......... 235/462.1 |
| 5,818,032 A * | 10/1998 | Sun et al. ..................... 235/494 |
| 6,389,182 B1 | 5/2002 | Ihara et al. |
| 6,764,373 B1 * | 7/2004 | Osawa et al. ................. 446/175 |
| 7,028,911 B2 * | 4/2006 | Cheung et al. ............... 235/494 |
| 7,128,270 B2 * | 10/2006 | Silverbrook et al. ... 235/472.01 |
| 7,264,174 B2 * | 9/2007 | Chang et al. ................. 235/494 |
| 7,497,380 B2 * | 3/2009 | Chang et al. ............ 235/462.09 |
| 2001/0044858 A1 * | 11/2001 | Rekimoto ...................... 710/1 |
| 2003/0016844 A1 * | 1/2003 | Numaoka ................... 382/100 |
| 2004/0011872 A1 * | 1/2004 | Shimizu ................. 235/462.11 |
| 2004/0026510 A1 * | 2/2004 | Cheung et al. ............ 235/462.1 |
| 2004/0190092 A1 * | 9/2004 | Silverbrook et al. ........ 358/539 |
| 2005/0199721 A1 * | 9/2005 | Chang et al. ............. 235/462.1 |
| 2005/0274804 A1 * | 12/2005 | Matsumoto ............ 235/462.01 |
| 2006/0163356 A1 * | 7/2006 | Shigekusa ................... 235/454 |

FOREIGN PATENT DOCUMENTS

JP 2000-82107 3/2000

\* cited by examiner

*Primary Examiner*—Daniel A Hess
*Assistant Examiner*—Paultep Savusdiphol
(74) *Attorney, Agent, or Firm*—Frommer Lawrence & Haug LLP; William S. Frommer; Ellen Marcie Emas

(57) ABSTRACT

A two-dimensional bar code recognizable by an information processing device, wherein elemental two-dimensional bar codes in which predetermined information is coded by two-dimensionally arranging a plurality of cells according to a predetermined arrangement rule form a nested structure.

11 Claims, 27 Drawing Sheets

121B

121B

TWO-DIMENSIONAL BAR CODE, INFORMATION PROCESSING DEVICE, INFORMATION PROCESSING METHOD, AND PROGRAM

CROSS REFERENCES TO RELATED APPLICATIONS

The present invention contains subject matter related to Japanese Patent Application JP 2005-369197 filed with the Japanese Patent Office on Dec. 22, 2005, the entire contents of which being incorporated herein by reference.

BACKGROUND OF THE INVENTION

1. Field of the Invention

The present invention relates to a two-dimensional bar code, an information processing device, an information processing method, and a program, and particularly to a two-dimensional bar code, an information processing device, an information processing method, and a program that make it possible to perform a predetermined process even when an image of the whole of the two-dimensional bar code is not supplied, for example.

2. Description of the Related Art

FIG. 1 shows an example of a 2D code system in the related art (see Japanese Patent Laid-Open No. 2000-082107, referred to as Patent Document 1 hereinafter).

In this example, a two-dimensional bar code (hereinafter referred to as a 2D code) 1 printed on a card 2 has predetermined information coded by two-dimensionally arranging a plurality of cells (parts shown in black in FIG. 1) according to a predetermined arrangement rule.

A camera 3 electrically connected to a personal computer 4 has a lens and an image pickup element using a CCD (Charge Coupled Device) or a CMOS (Complementary Metal Oxide Semiconductor) for reading electric charge. The camera 3 is a device for converting light into an electric signal. The camera 3 for example captures an image of an image pickup area 3A determined by an installation position, a direction and the like of the camera 3 as an electric signal (image data), and then supplies the image data to the personal computer 4.

The personal computer 4 supplies the image data from the camera 3 to a monitor 11 to display the image. In the example of FIG. 1, an image including the 2D code 1 is displayed on the monitor 11.

In addition, when an image of the whole of the 2D code 1 is included in the image data supplied from the camera 3, the personal computer 4 can recognize the 2D code 1, and perform a process corresponding to information coded in the 2D code 1 obtained as a result of the recognition.

For example, when the image data supplied from the camera 3 includes an image of the whole of the 2D code 1, as shown in FIG. 1, the personal computer r 4 can synthesize a predetermined CG (Computer Graphics) image (an image of a world map in this example) corresponding to the coded information obtained as a result of the recognition of the 2D code 1 in an area where the 2D code 1 is displayed, and display the CG image on the monitor 11, as shown in FIG. 2.

SUMMARY OF THE INVENTION

As shown in FIG. 3, the 2D code 1 in the related art includes a guide part 51 and a code part 52 provided in a rectangular area of a predetermined size, as shown in FIG. 3.

The guide part 51 is a rectangular cell of a predetermined size, and is disposed at a position corresponding to one side of the rectangle of the 2D code 1.

The code part 52 has a rectangular area with four square corner cells 61-1 to 61-4 (hereinafter referred to simply as corner cells 61 when the corner cells 61-1 to 61-4 do not have to be differentiated from each other) situated at four corners of the rectangular area. Within the area, square coded cells 62 are arranged in a two-dimensional pattern according to information to be coded. When the guide part 51 is situated on a lower side, the code part 52 is disposed above the guide part 51 at a predetermined distance from the guide part 51.

The personal computer 4 detects the guide part 51 and the corner cells 61 in the code part 52 from an image of the 2D code 1, and identifies the area where the code part 52 is present on the basis of the guide part 51 and the corner cells 61. In addition, the personal computer 4 obtains the coded information from the arrangement pattern of the coded cells 62 present within the area.

That is, when the 2D code 1 is placed within the image pickup area 3A of the camera 3 as shown in FIG. 1, and therefore an image including the whole of the 2D code 1 is supplied to the personal computer 4, the personal computer 4 can detect the guide part 51 and the code part 52, and thus recognize the 2D code 1.

On the other hand, for example, when the camera 3 in FIG. 1 is moved in a right direction in the figure or moved in a downward direction in the figure, for example, changing the position or the size of the image pickup area 3A, and consequently the whole of the 2D code 1 is not included in the image pickup area 3A as shown in FIG. 4A or FIG. 4B, so that an image of the whole of the 2D code 1 is not supplied to the personal computer 4, the personal computer 4 may not detect the guide part 51 or the code part 52 of the 2D code 1, and therefore may not recognize the 2D code 1. As a result, the personal computer 4 may not perform the process of displaying the world map as shown in FIG. 2.

Thus, the 2D code system in the related art may require that the whole of the 2D code 1 be situated so as to be included in the image pickup area 3A of the camera 3, and accordingly limits positional relation between the camera 3 and the 2D code 1. Therefore an inconvenience can occur in the use of the system.

The present invention has been made in view of the above, and it is desirable to be able to perform a predetermined process even when an image of the whole of the 2D code is not supplied, for example.

According to an embodiment of the present invention, there is provided a two-dimensional bar code recognizable by an information processing device, wherein elemental two-dimensional bar codes in which predetermined information is coded by two-dimensionally arranging a plurality of cells according to a predetermined arrangement rule form a nested structure.

According to an embodiment of the present invention, there is provided an information processing device for recognizing a two-dimensional bar code in which elemental two-dimensional bar codes having predetermined information coded by two-dimensionally arranging a plurality of cells according to a predetermined arrangement rule form a nested structure, the information processing device including: recognizing means for recognizing an elemental two-dimensional bar code; obtaining means for obtaining identifying information and process information coded in the elemental two-dimensional bar code recognized by the recognizing means, the identifying information being assigned in correspondence with a level and an arrangement position in the nested structure; and performing means for performing a process based on the process information according to the identifying information.

According to an embodiment of the present invention, there is provided an information processing method for recognizing a two-dimensional bar code in which elemental two-dimensional bar codes having predetermined information coded by two-dimensionally arranging a plurality of cells according to a predetermined arrangement rule form a nested structure, or a program for making a personal computer perform information processing for recognizing a two-dimensional bar code in which elemental two-dimensional bar codes having predetermined information coded by two-dimensionally arranging a plurality of cells according to a predetermined arrangement rule form a nested structure, the information processing method or the program including the steps of: recognizing an elemental two-dimensional bar code; obtaining identifying information and process information coded in the elemental two-dimensional bar code recognized by a process of the recognizing step, the identifying information being assigned in correspondence with a level and an arrangement position in the nested structure; and performing a process based on the process information according to the identifying information.

The information processing device, the information processing method or the program according to the above-described embodiment of the present invention recognizes an elemental two-dimensional bar code, obtains identifying information and process information coded in the recognized elemental two-dimensional bar code, the identifying information being assigned in correspondence with a level and an arrangement position in the nested structure, and performs a process based on the process information according to the identifying information.

According to the above-described embodiments of the present invention, a predetermined process can be performed even when an image of the whole of a 2D code may not be obtained, for example.

DETAILED DESCRIPTION OF THE PREFERRED EMBODIMENTS

Preferred embodiments of the present invention will hereinafter be described. Correspondences between constitutional requirements of the present invention and embodiments described in the specification or the drawings are illustrated as follows. This description is to confirm that embodiments supporting the present invention are described in the specification or the drawings. Therefore, even when there is an embodiment described in the specification or drawings but not described here as an embodiment corresponding to a constitutional requirement of the present invention, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

Figure 8:
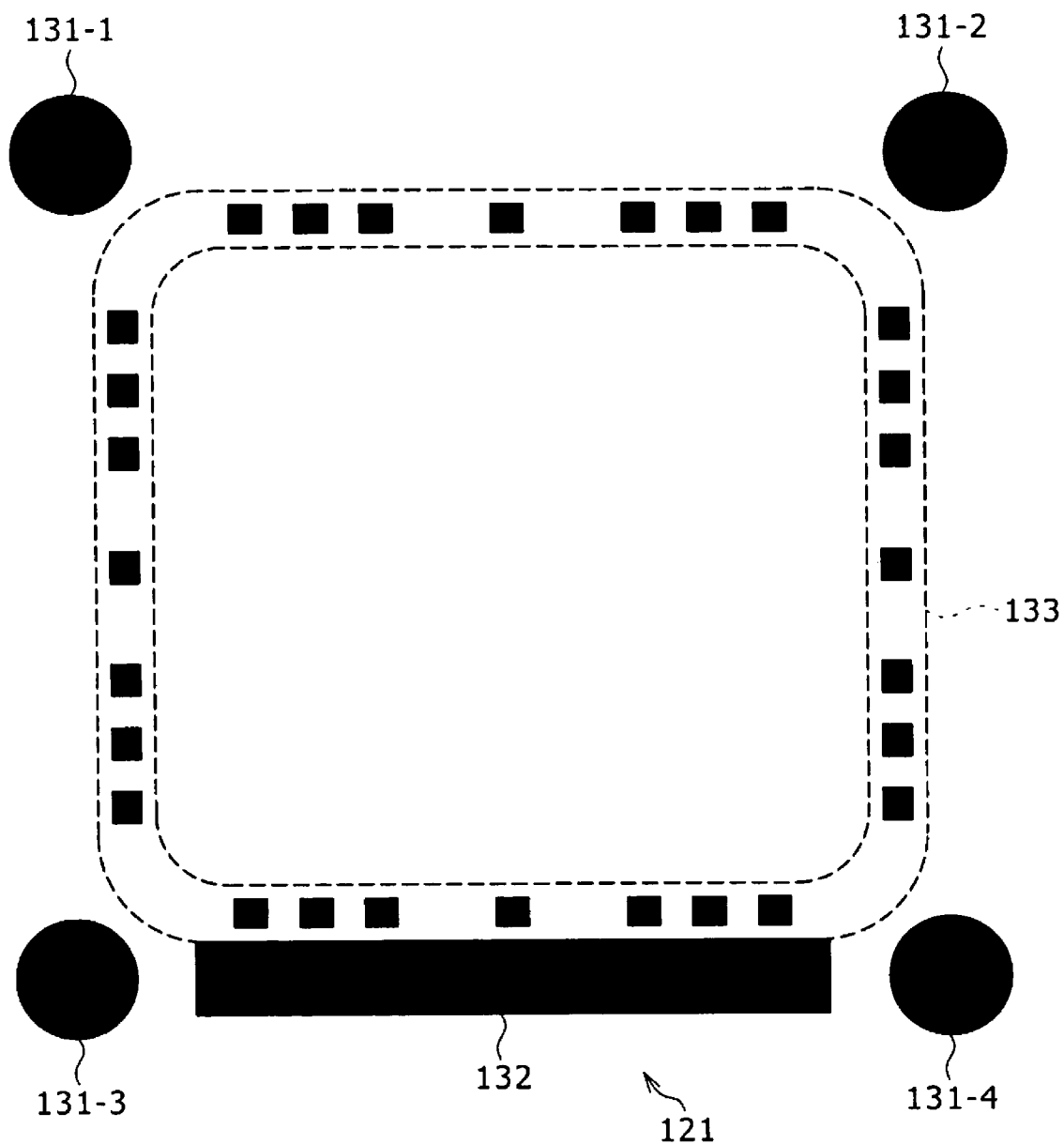
FIG. 8 is a diagram of assistance in explaining the configuration of the 2D code in FIG. 5.
Figure 9:
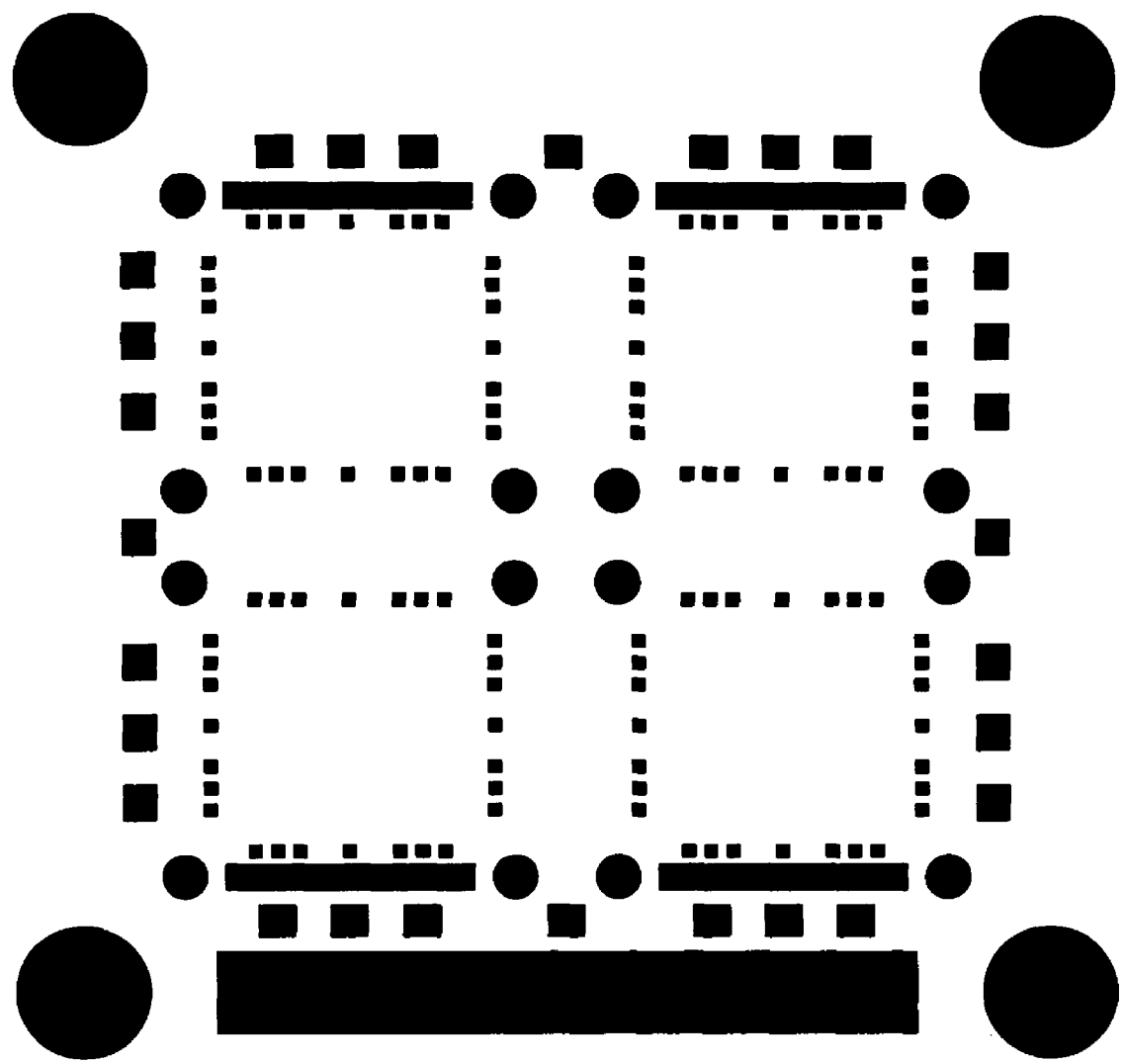
FIG. 9 is another diagram of assistance in explaining the configuration of the 2D code in FIG. 5.

A 2D code according to an embodiment of the present invention is a two-dimensional bar code (2D code 101 in FIG. 7, for example) recognizable by an information processing device, wherein elemental two-dimensional bar codes (elemental 2D codes 121 in FIG. 8, for example) in which predetermined information is coded by two-dimensionally arranging a plurality of cells according to a predetermined arrangement rule form a nested structure (FIG. 9, for example).

In the nested structure, second elemental two-dimensional bar codes (elemental 2D code 121B in FIG. 10B, for example) can be included within an area of a first elemental two-dimensional bar code (elemental 2D code 121A in FIG. 10A, for example), and the second elemental two-dimensional bar codes can be arranged in a plural unit (a unit of four (FIG. 11), for example) according to a predetermined rule at each level of the nested structure.

Figure 11:
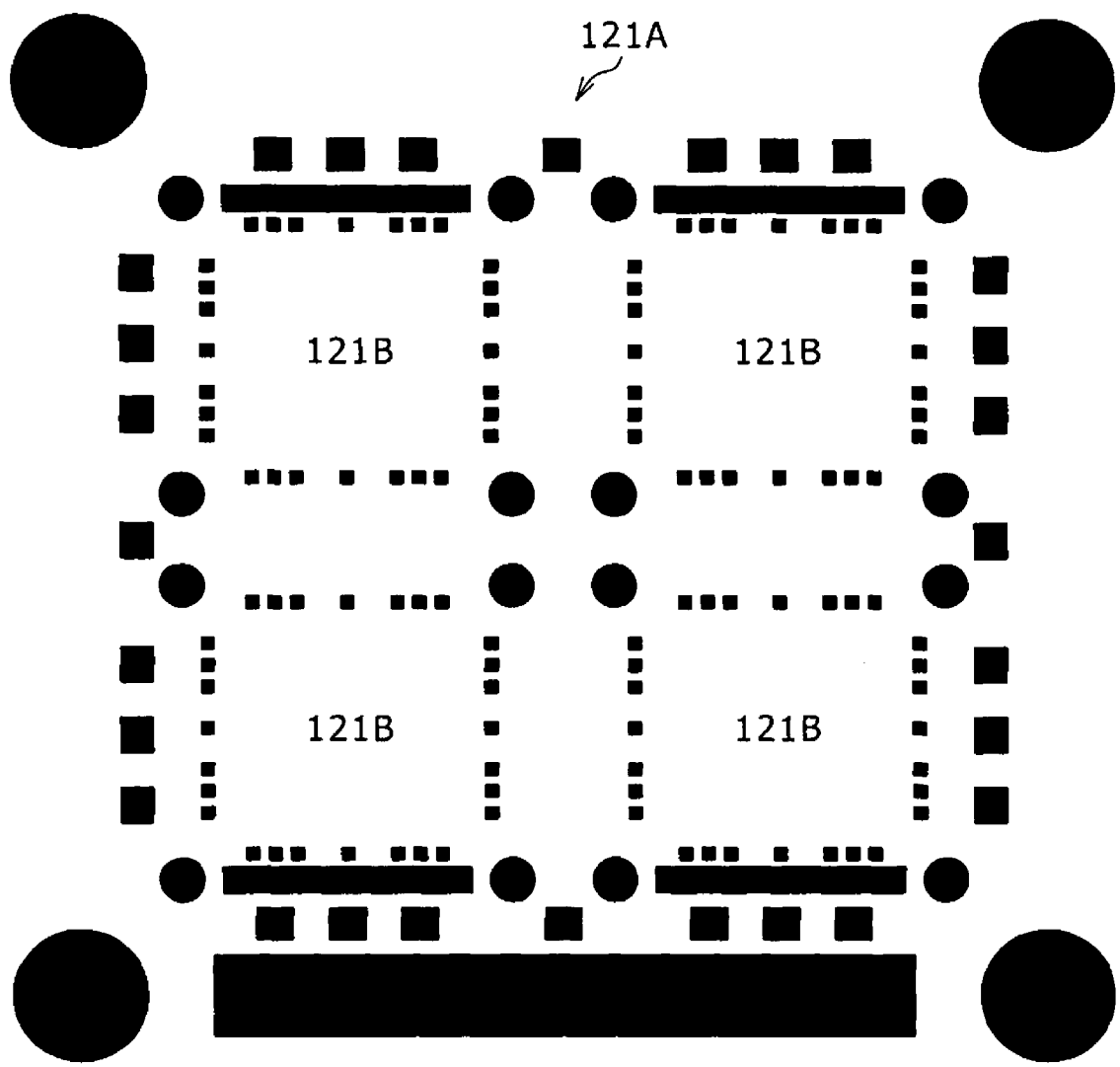
FIG. 11 is another diagram of assistance in explaining the configuration of the 2D code in FIG. 5.
Figure 12:
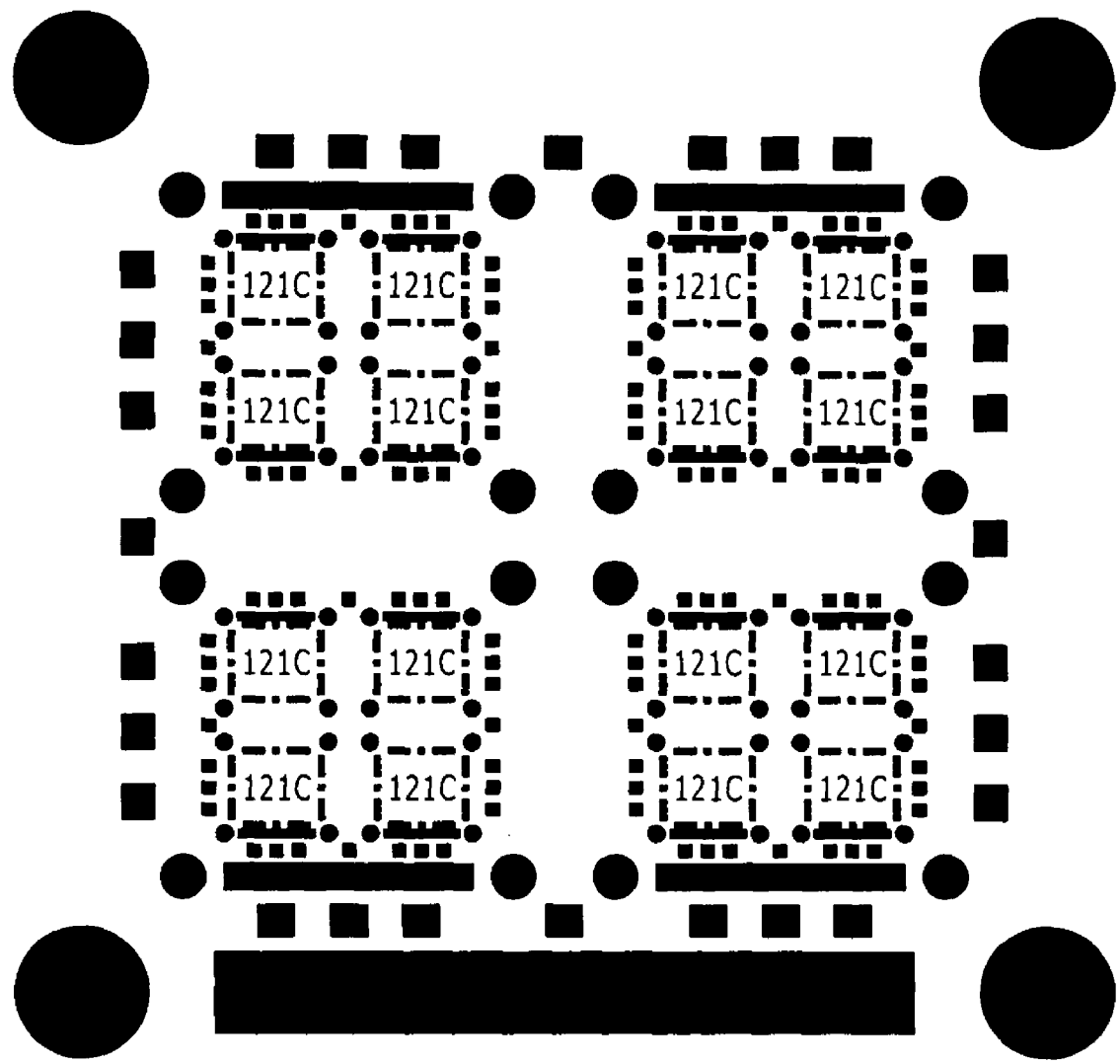
FIG. 12 is another diagram of assistance in explaining the configuration of the 2D code in FIG. 5.

The predetermined rule can be same at each level (FIG. 11 and FIG. 12, for example).

Identifying information (an ID number shown in FIG. 13, for example) corresponding to a level and an arrangement position in the nested structure and information (an image of a world map displayed in FIG. 6, for example) corresponding to a predetermined process can be coded in each of the elemental two-dimensional bar codes.

The elemental two-dimensional bar code can include corner cells (corner cells 131 in FIG. 8, for example), a guide cell (guide cell 132 in FIG. 8, for example), and coded cells (coded cells 133 in FIG. 8, for example) in which the predetermined information is coded, the coded cells being arranged in an area identified by the corner cells and the guide cell, and the second elemental two-dimensional bar codes can be included within an area identified by the corner cells of the first elemental two-dimensional bar code, the guide cell, or the corner cells (FIG. 9, for example).

The corner cells (corner cells in FIG. 8, for example) can be circular cells, and be arranged at corners of a square of a predetermined size.

An information processing device according to an embodiment of the present invention is an information processing device (personal computer 201 in FIG. 5, for example) for recognizing a two-dimensional bar code in which elemental two-dimensional bar codes having predetermined information coded by two-dimensionally arranging a plurality of cells according to a predetermined arrangement rule form a nested structure, the information processing device including: recognizing means (code recognizing unit 242 in FIG. 16, for example) for recognizing an elemental two-dimensional bar code; obtaining means (code recognizing unit 242 in FIG. 16, for example) for obtaining identifying information and process information coded in the elemental two-dimensional bar code recognized by the recognizing means, the identifying information being assigned in correspondence with a level and an arrangement position in the nested structure; and performing means (processing unit 231 in FIG. 16, for example) for performing a process based on the process information according to the identifying information.

Figure 20:
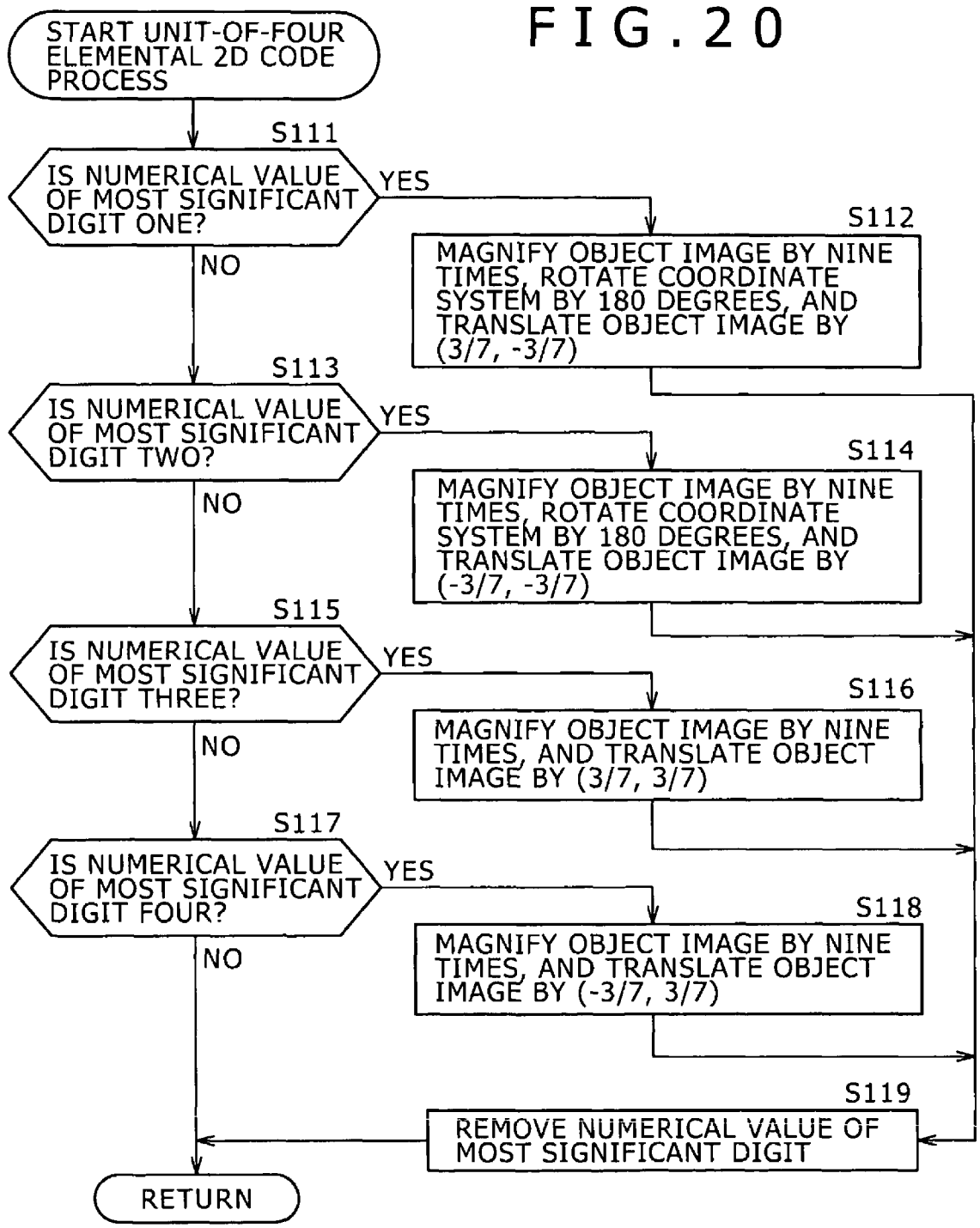
FIG. 20 is a flowchart of assistance in explaining details of a process of step S104 in FIG. 19.

The performing means can change one of a size, an orientation, and a position of an image associated with the elemental two-dimensional bar code on a basis of the identifying information of the elemental two-dimensional bar code, and display the image (step S112 and the like in FIG. 20, for example).

Figure 19:
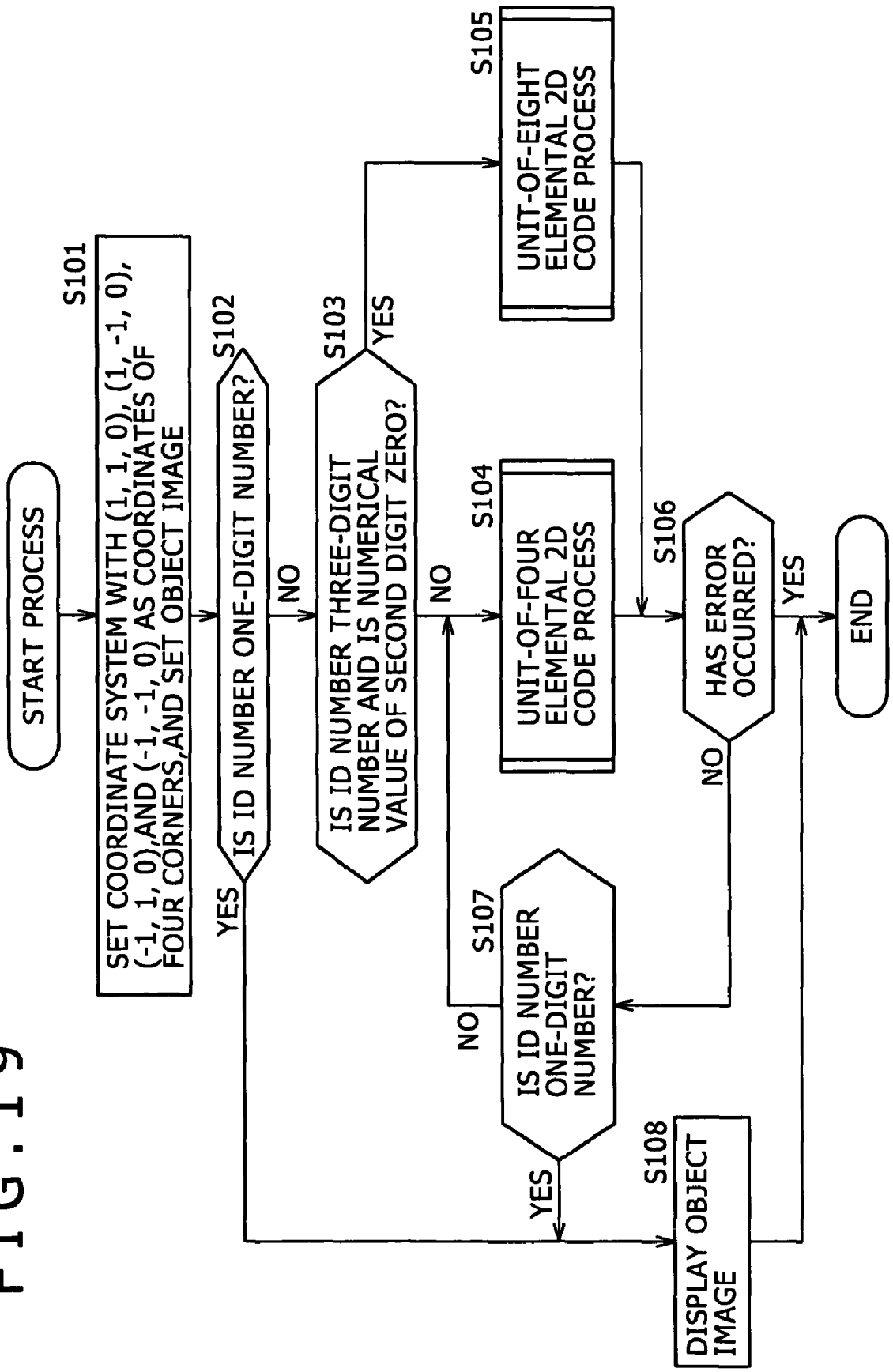
FIG. 19 is a flowchart of assistance in explaining a process corresponding to a 2D code.

An information processing method or a program according to an embodiment of the present invention is an information processing method for recognizing a two-dimensional bar code in which elemental two-dimensional bar codes having predetermined information coded by two-dimensionally arranging a plurality of cells according to a predetermined arrangement rule form a nested structure, or a program for making a personal computer perform information processing for recognizing a two-dimensional bar code in which elemental two-dimensional bar codes having predetermined information coded by two-dimensionally arranging a plurality of cells according to a predetermined arrangement rule form a nested structure, the information processing method or the program including the steps of: recognizing an elemental two-dimensional bar code (steps S1 to S10 in FIG. 17, for example); obtaining identifying information and process information coded in the elemental two-dimensional bar code recognized by a process of the recognizing step, the identifying information being assigned in correspondence with a level and an arrangement position in the nested structure (step S11 in FIG. 17, for example); and performing a process based on the process information according to the identifying information (process of FIG. 19, for example).

Figure 5:
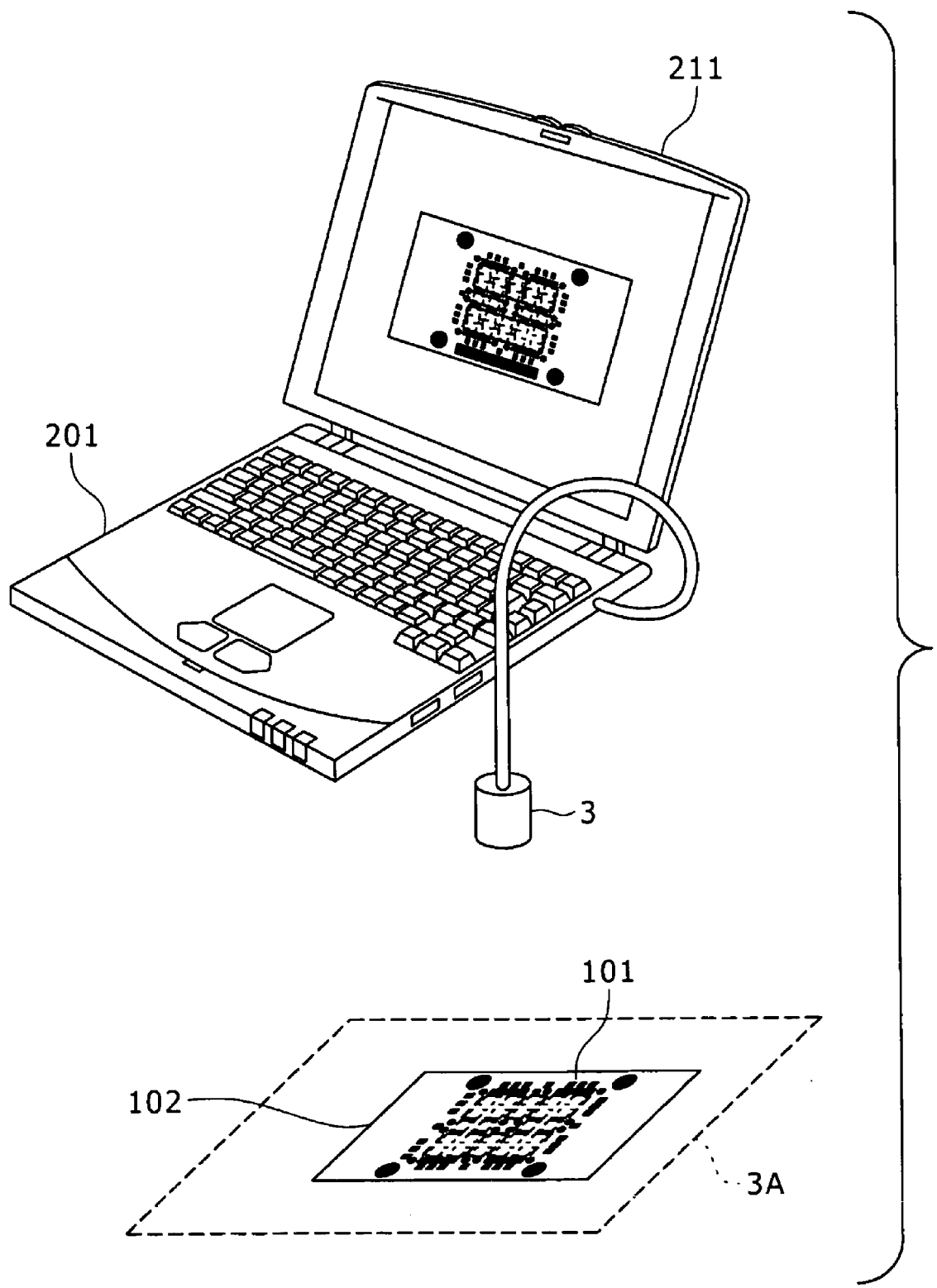
FIG. 5 is a diagram showing an example of configuration of a 2D code system to which the present invention is applied.

FIG. 5 shows an example of configuration of a 2D code system to which the present invention is applied.

Though details will be described later with reference to FIG. 8, a 2D code 101 printed on a card 102, for example, has a nested structure formed by 2D codes (hereinafter referred to as elemental 2D codes) 121 in which predetermined information (information representing an image of a world map in this example) is coded by two-dimensionally arranging a plurality of cells according to a predetermined arrangement rule.

Figure 1:
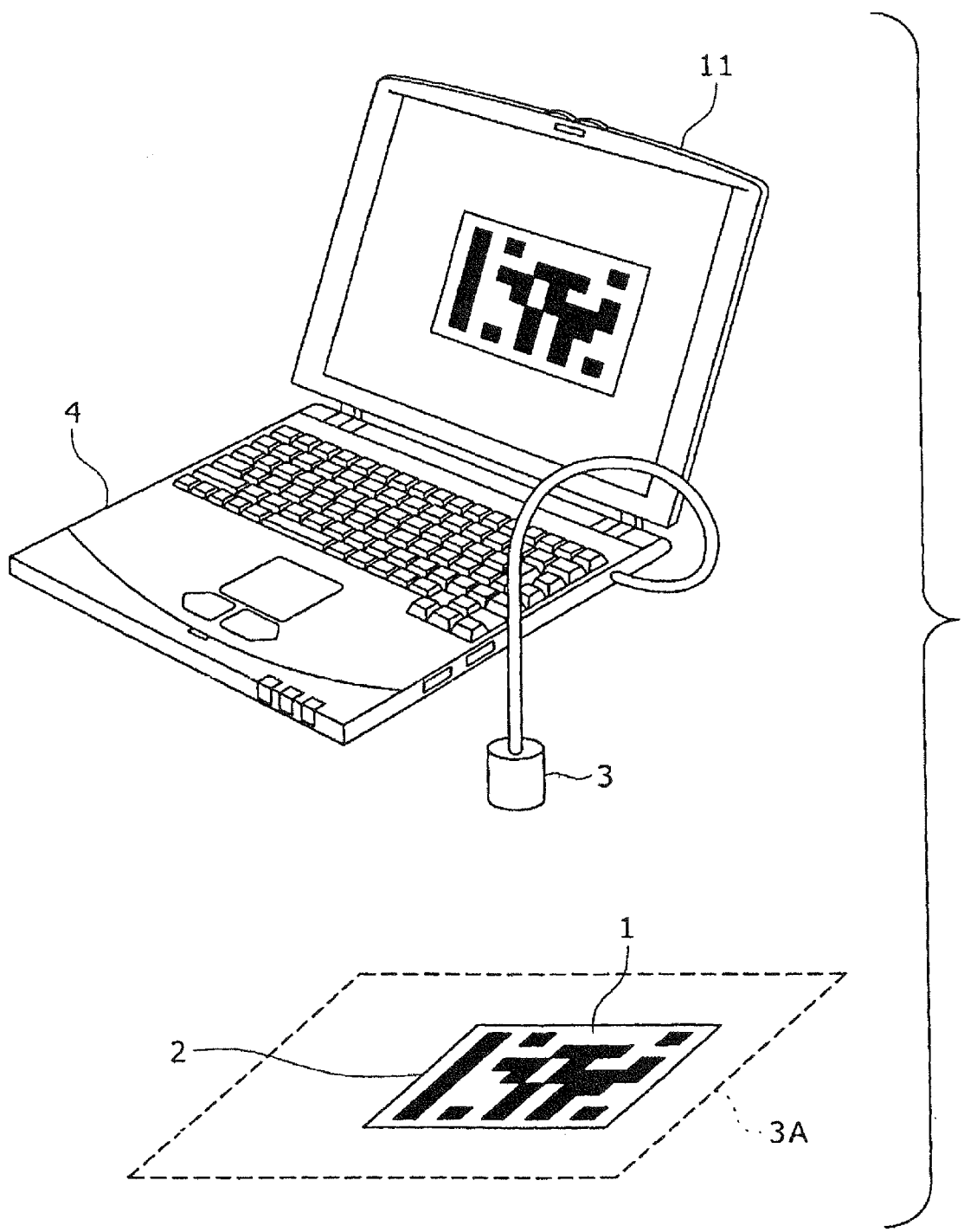
FIG. 1 is a diagram showing an example of configuration of a conventional 2D code system in the related art.
Figure 2:
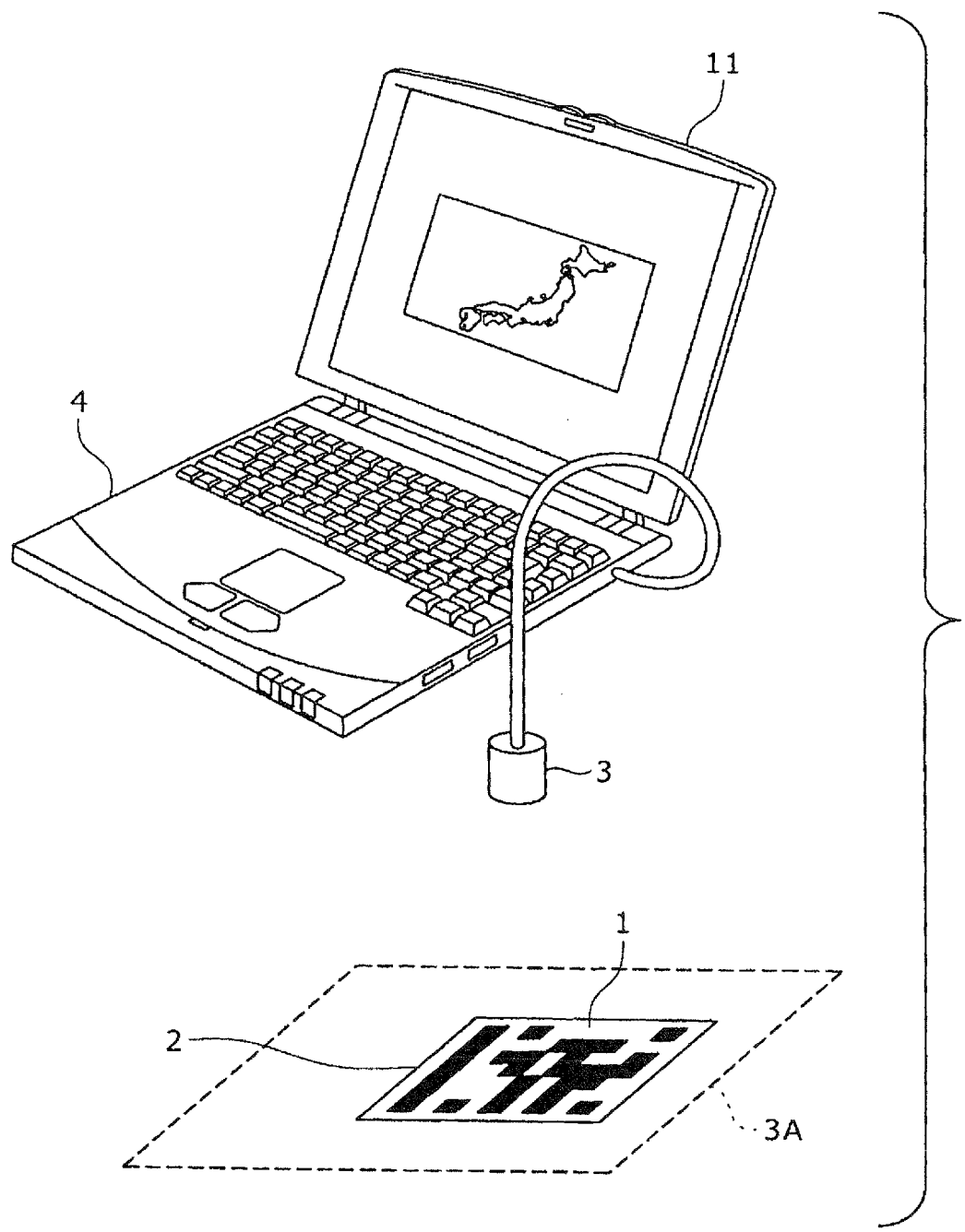
FIG. 2 is a diagram showing an example of use of the 2D code system in FIG. 1.
Figure 3:
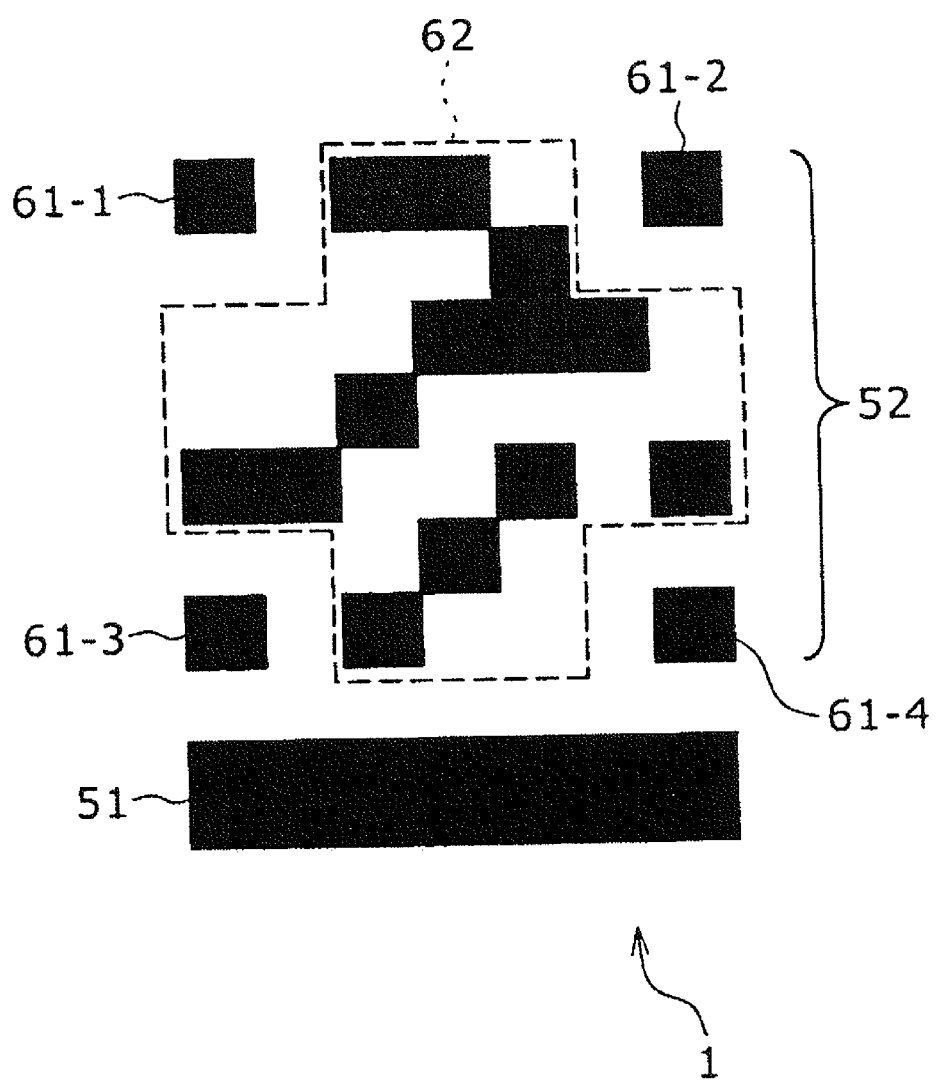
FIG. 3 is a diagram showing an example of configuration of a 2D code in FIG. 1.
Figure 4B:
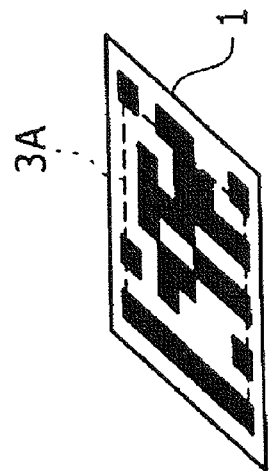
FIGS. 4A and 4B are diagrams showing other examples of an image pickup area 3A in FIG. 1.
Figure 4A:
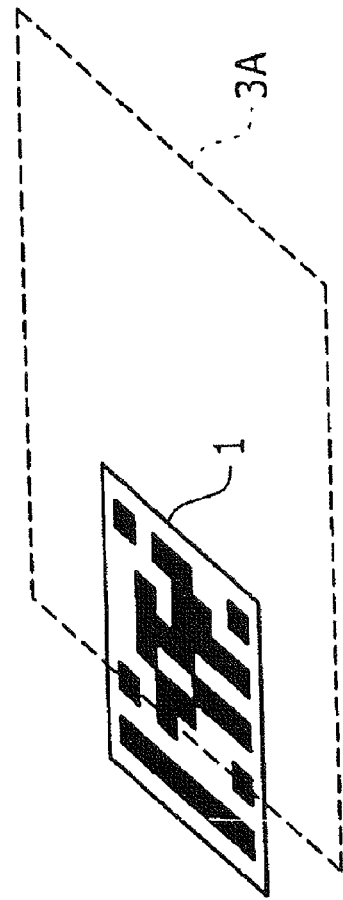

As in the example of FIG. 1, a camera 3 electrically connected to a personal computer 201 has a lens and an image pickup element using a CCD or a CMOS for reading electric charge. The camera 3 is a device for converting light into an electric signal. The camera 3 for example captures an image of an image pickup area 3A determined by an installation position, a direction and the like of the camera 3 as an electric signal (image data), and then supplies the image data to the personal computer 201.

The personal computer 201 supplies the image data from the camera 3 to a monitor 211 to display the image. In FIG. 5, an image including the 2D code 101 is displayed on the monitor 211.

In addition, when the 2D code 101 is included in the image data supplied from the camera 3, the personal computer 201 can also recognize a given elemental 2D code 121 (FIG. 13) forming the 2D code 101, and perform a process corresponding to information coded in the elemental 2D code 121 and a position of the elemental 2D code 121 on the 2D code 101.

In this example, though details will be described later, an image (hereinafter referred to as a coded image) represented by coded image information is displayed in such a manner as to correspond to an area on display of the 2D code 101.

Figure 6:
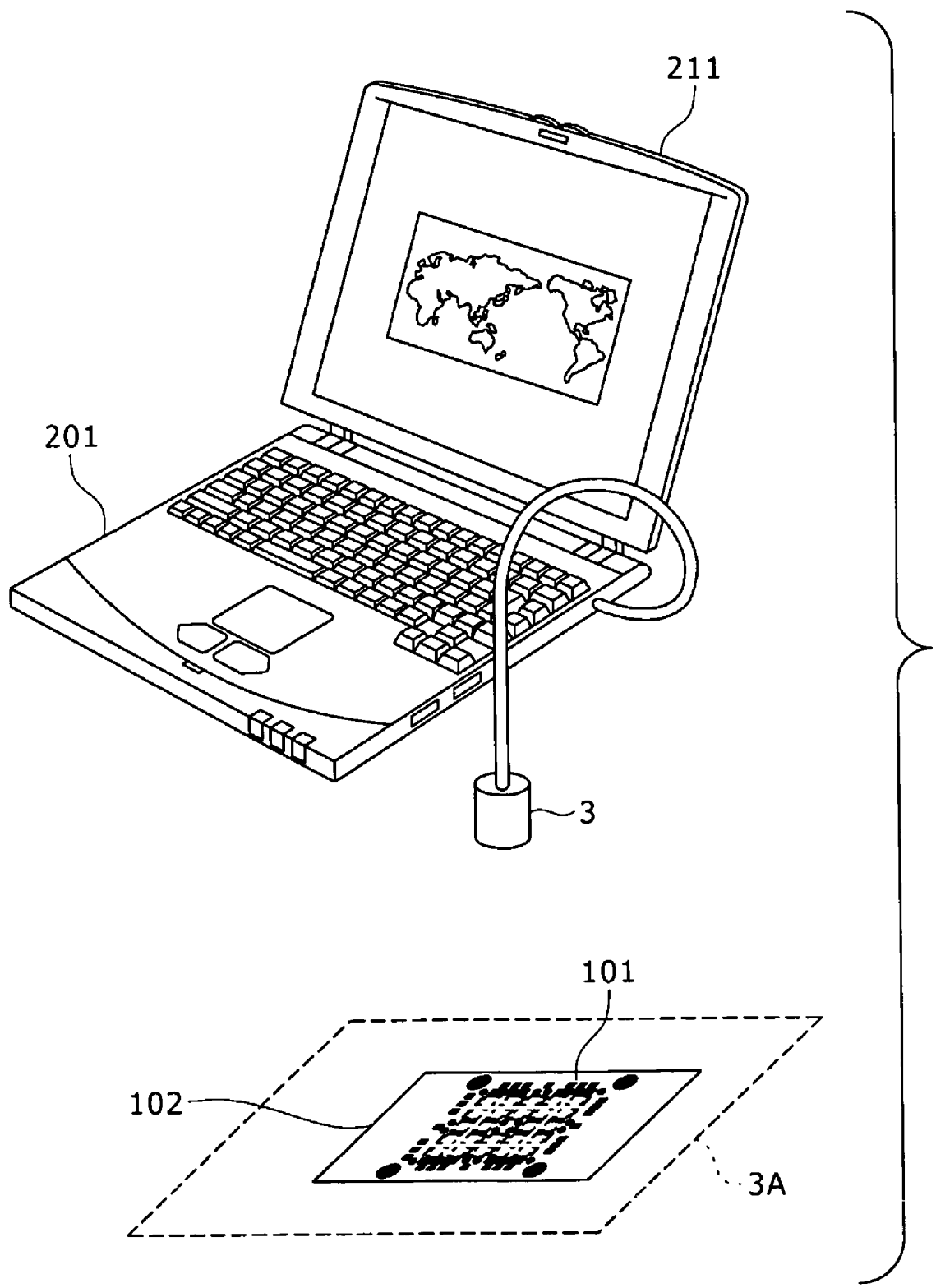
FIG. 6 is a diagram showing an example of use of the 2D code system in FIG. 5.

For example, when image data including the whole of the 2D code 101 is supplied from the camera 3, and thus the whole of the 2D code 101 can be displayed (FIG. 5), the whole of the coded image is displayed in such a manner as to correspond to the area of the whole of the 2D code 101 that can be displayed, as shown in FIG. 6.

When image data including only a part of the 2D code 101 is supplied from the camera 3, and thus only the part of the 2D code 101 can be displayed, a part of the coded image which part corresponds to the area of the 2D code 101 which area can be displayed is displayed in such a manner as to be adjusted according to the area of the 2D code 101 which area can be displayed.

Figure 7:
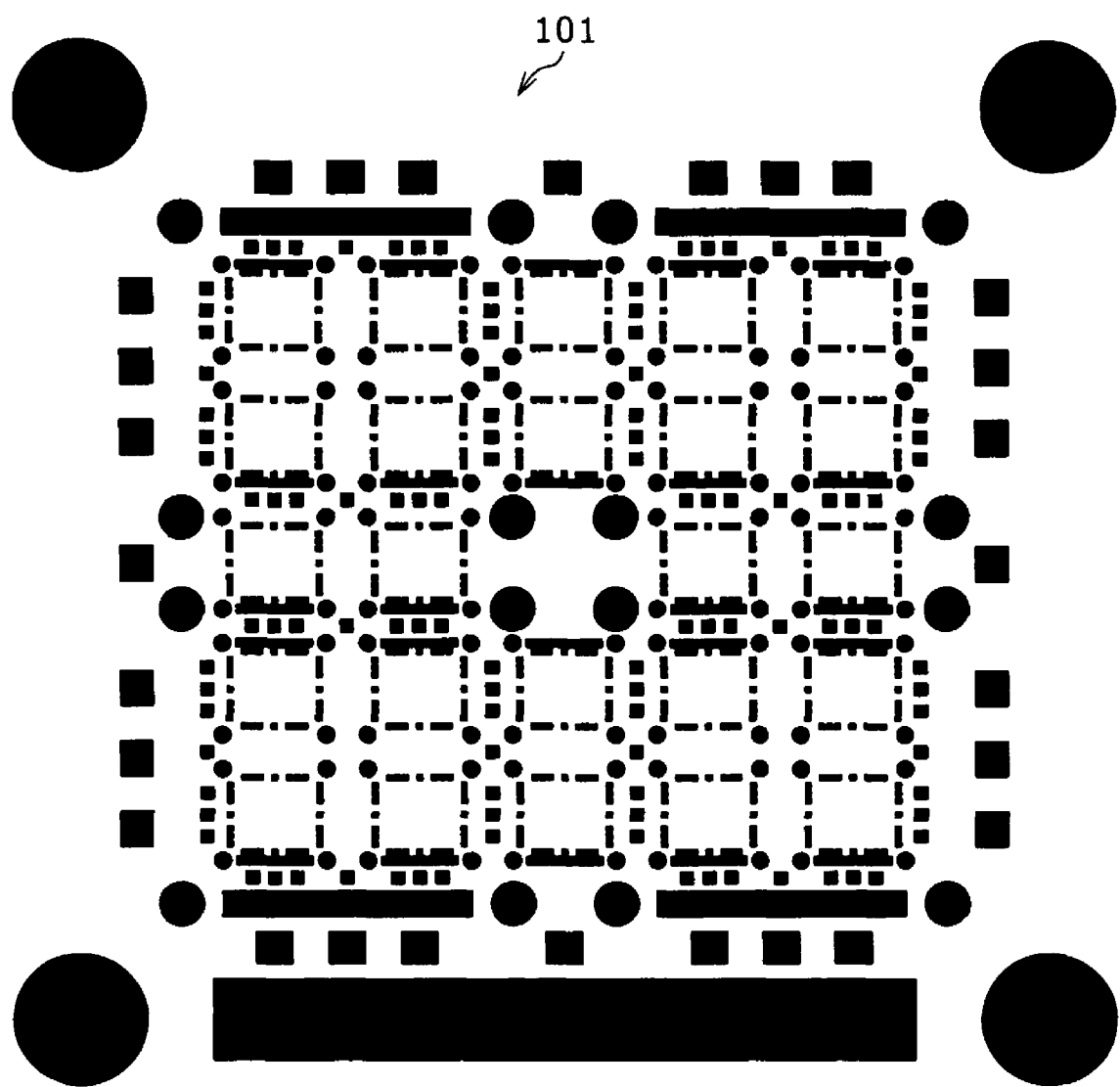
FIG. 7 is a diagram showing an example of configuration of a 2D code in FIG. 5.

FIG. 7 shows an example of configuration of the 2D code 101.

As shown in FIG. 8, the 2D code 101 has a nested structure formed by elemental 2D codes 121 including corner cells 131-1 to 131-4 (hereinafter referred to as corner cells 131 when the corner cells 131-1 to 131-4 do not have to be differentiated from each other), a guide cell 132, and coded cells 133, the nested structure including a unit of four elemental 2D codes 121 in a central part of a large elemental 2D code 121 such that for example the guide cells 132 of the four elemental 2D codes 121 face outward (are symmetric with respect to each other), as shown in FIG. 9, for example.

Figure 10A:
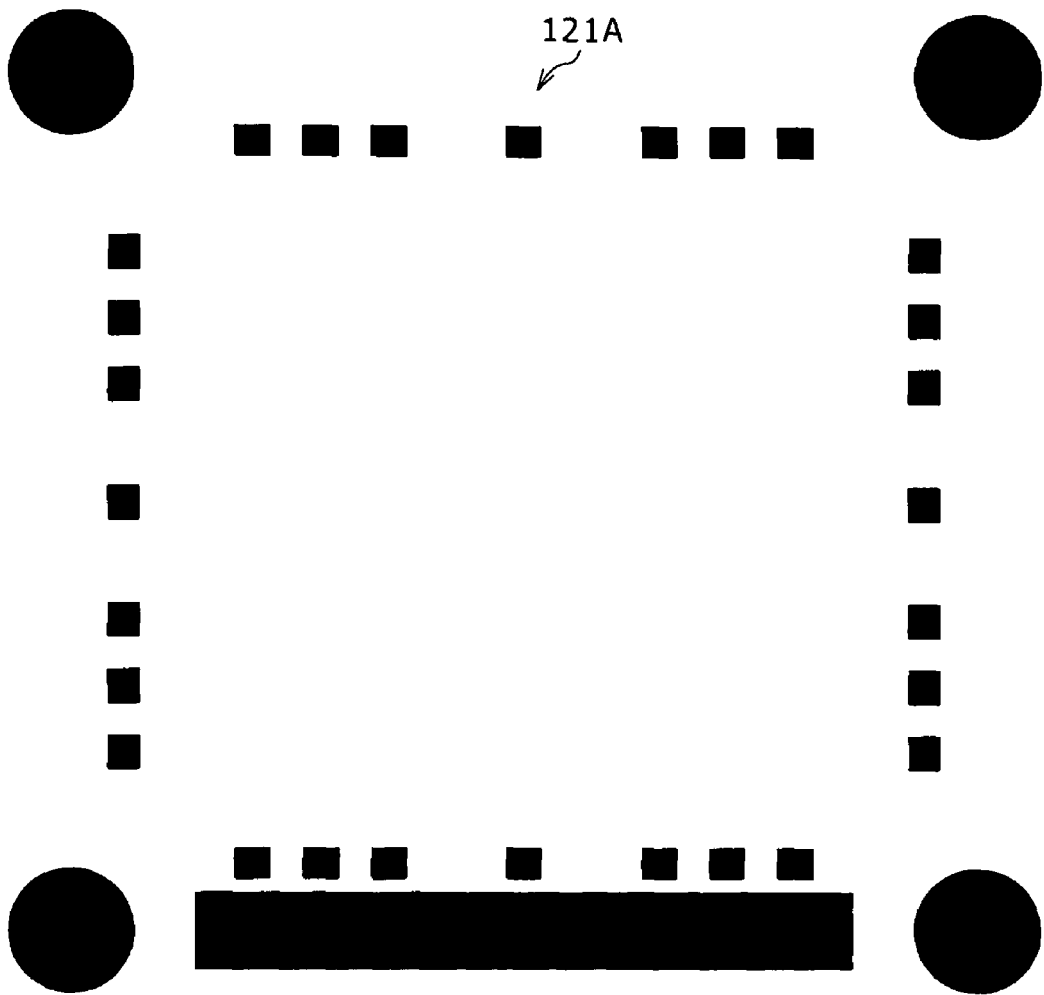
FIGS. 10A, 10B, and 10C are other diagrams of assistance in explaining the configuration of the 2D code in FIG. 5.
Figure 10B:
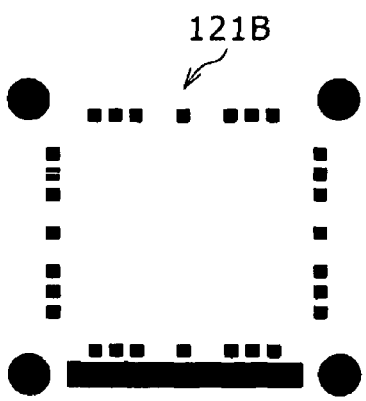
Figure 10C:
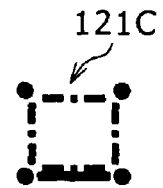

Specifically, in the example of FIG. 7, as shown in FIG. 11, a central part of a large elemental 2D code 121A shown in FIG. 10A includes a unit of four elemental 2D codes 121B as shown in FIG. 10B, the elemental 2D codes 121B having ⅛ of a size of the elemental 2D code 121A, and as shown in FIG. 12, a central part of each of the elemental 2D codes 121B includes a unit of four elemental 2D codes 121C as shown in FIG. 10C, the elemental 2D codes 121C having ⅑ of a size of the elemental 2D code 121B.

Incidentally, an area within each elemental 2D code 121C can include even smaller elemental 2D codes 121 to form a nested structure. However, because of a limit to the size of a recognizable elemental 2D code 121, the area does not include elemental 2D codes 121 in this example.

In addition, in the example of FIG. 7, an area between the elemental 2D codes 121B includes a unit of eight elemental 2D codes 121C.

Incidentally, an area between the elemental 2D codes 121C can include even smaller elemental 2D codes 121 to form a nested structure. However, because of the limit to the size of a recognizable elemental 2D code 121, the area does not include elemental 2D codes 121 in this example.

Thus, the 2D code 101 has the nested structure formed by the elemental 2D codes 121.

Description will next be made of the corner cells 131, the guide cell 132, and the coded cells 133 of an elemental 2D code 121 (FIG. 8).

The corner cells 131 are circular cells, and are arranged at corners of a square of a predetermined size. The guide cell 132 is disposed at a position corresponding to one side of the square. The corner cells 131 and the guide cell 132 are used to identify an area where the coded cells 133 are arranged.

The coded cells 133 are arranged in an area corresponding to the four sides of the square formed by the corner cells 131. Predetermined information is coded according to an arrangement pattern.

In this example, information representing an image (coded image) of a same world map is coded in the area of the coded cells 133 of each elemental 2D code 121.

An ID number of the elemental 2D code 121 is also coded in the area of the coded cells 133.

In this example, the elemental 2D codes 121 form a nested structure of basically three levels. Accordingly, a one-digit ID number is given to the elemental 2D code 121A at the first level. A two-digit ID number having the ID number of the elemental 2D code 121A at the first level as the numerical value of a first digit is given to an elemental 2D code 121B at the second level. When an elemental 2D code 121C at the third level is disposed within an elemental 2D code 121B, the elemental 2D code 121C is assigned a three-digit ID number having the ID number of the elemental 2D code 121B to which the elemental 2D code 121C belongs as a numerical value up to a second digit. When an elemental 2D code 121C is disposed between elemental 2D codes 121B, the elemental 2D code 121C is assigned a three-digit ID number having the ID number of the elemental 2D code 121A as the numerical value of a first digit and "0" as the numerical value of a second digit.

Figure 13:
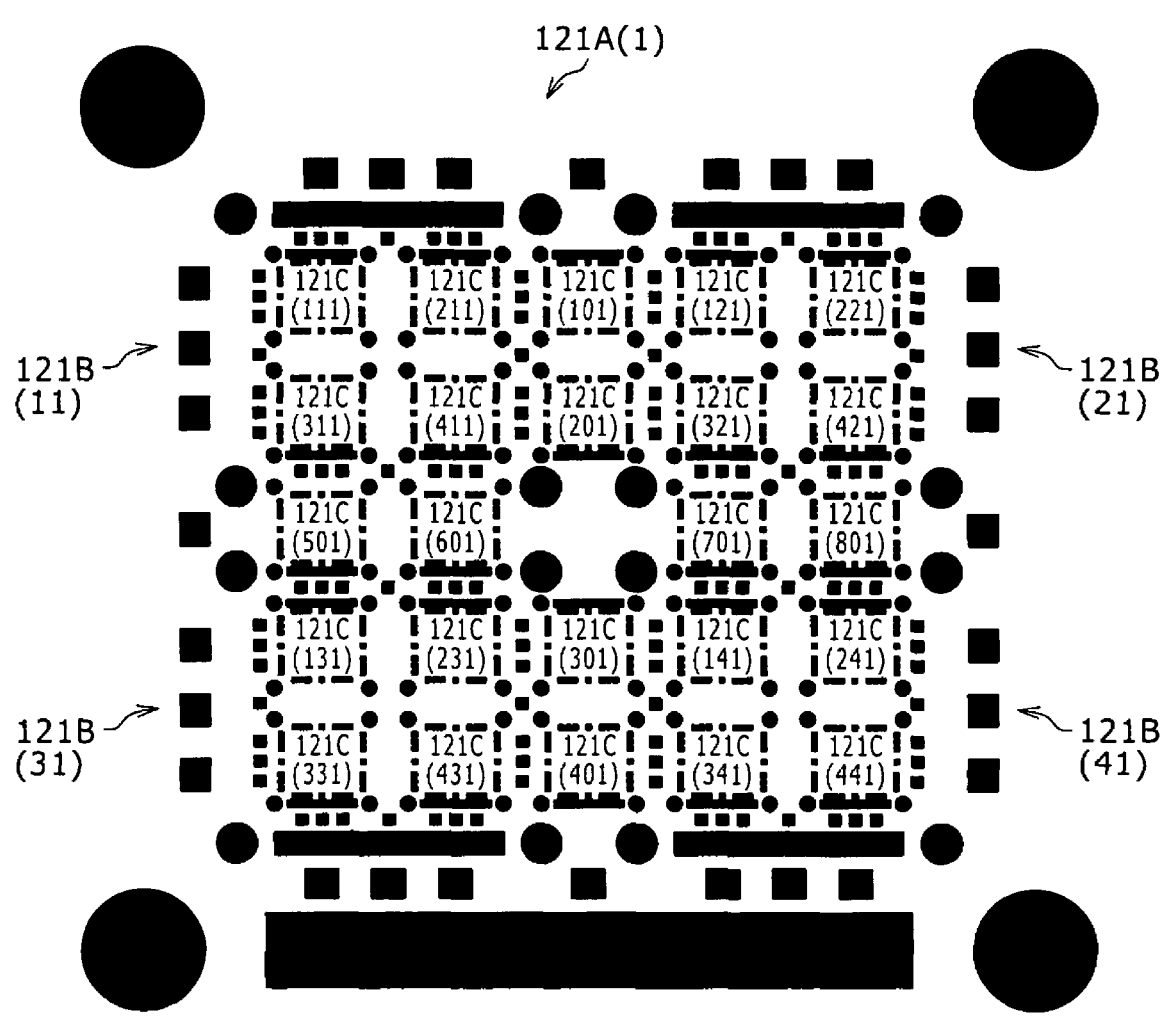
FIG. 13 is another diagram of assistance in explaining the configuration of the 2D code in FIG. 5.

Specifically, as shown in FIG. 13, the elemental 2D code 121A is assigned an ID number of "1". Incidentally, in FIG. 13, a numerical value shown in parentheses represents the ID number of a corresponding elemental 2D code 121.

Figure 14:
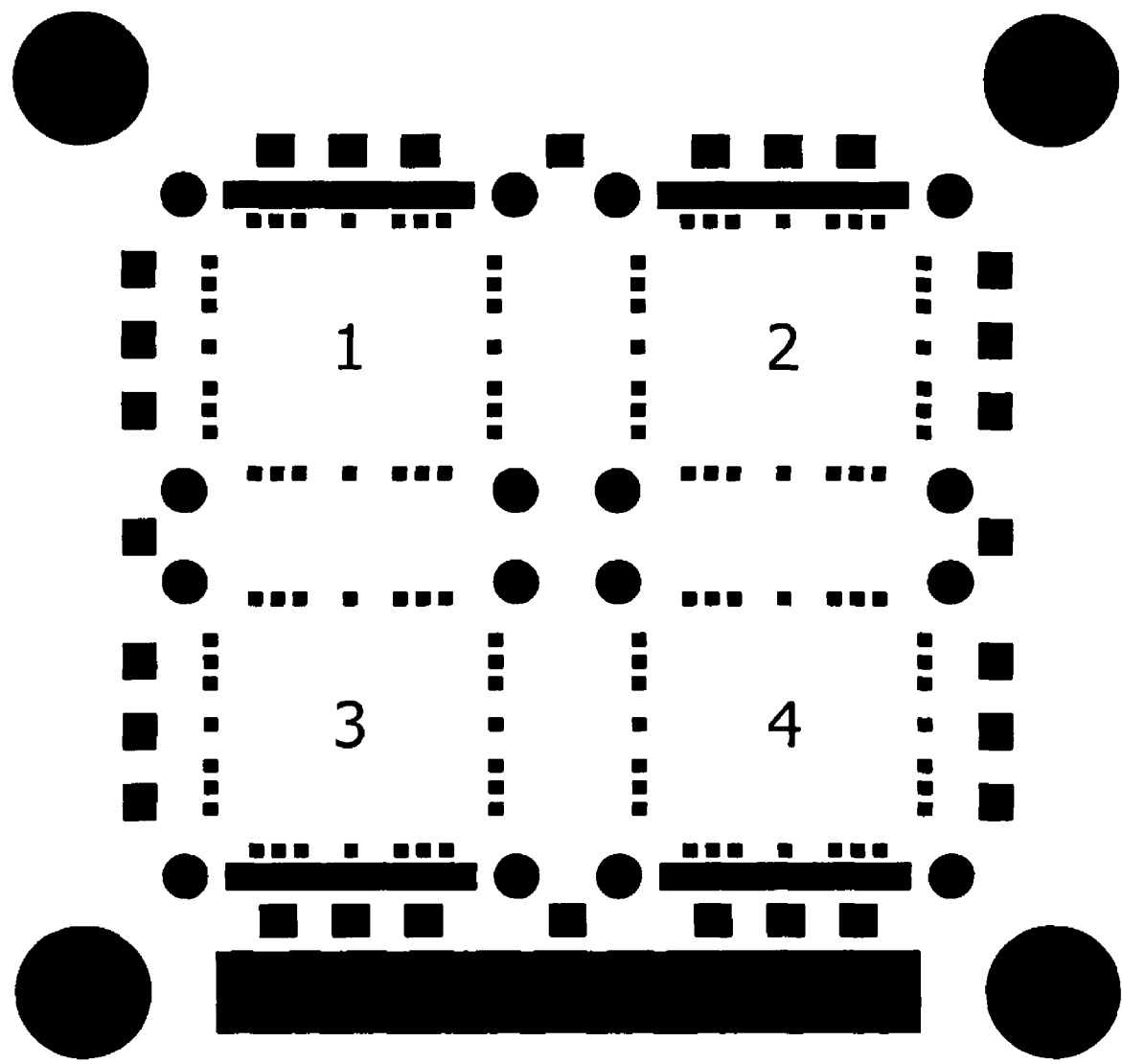
FIG. 14 is another diagram of assistance in explaining the configuration of the 2D code in FIG. 5.

Elemental 2D codes 121 (hereinafter referred to as unit-of-four elemental 2D codes 121 as appropriate) included in an elemental 2D code 121 in a unit of four are given numbers corresponding to arrangement positions, as shown in FIG. 14. Thus, as shown in FIG. 13, an upper left elemental 2D code 121B within the elemental 2D code 121A is assigned "11"; an upper right elemental 2D code 121B is assigned "21"; a lower left elemental 2D code 121B is assigned "31"; and a lower right elemental 2D code 121B is assigned "41".

Further, as shown in FIG. 13, an upper left elemental 2D code 121C in the elemental 2D code 121B having the ID number "11" is assigned "111"; an upper right elemental 2D code 121C is assigned "211"; a lower left elemental 2D code 121C is assigned "311"; and a lower right elemental 2D code 121C is assigned "411".

Elemental 2D codes 121C within the other elemental 2D codes 121B are assigned ID numbers according to a similar rule.

Figure 15:
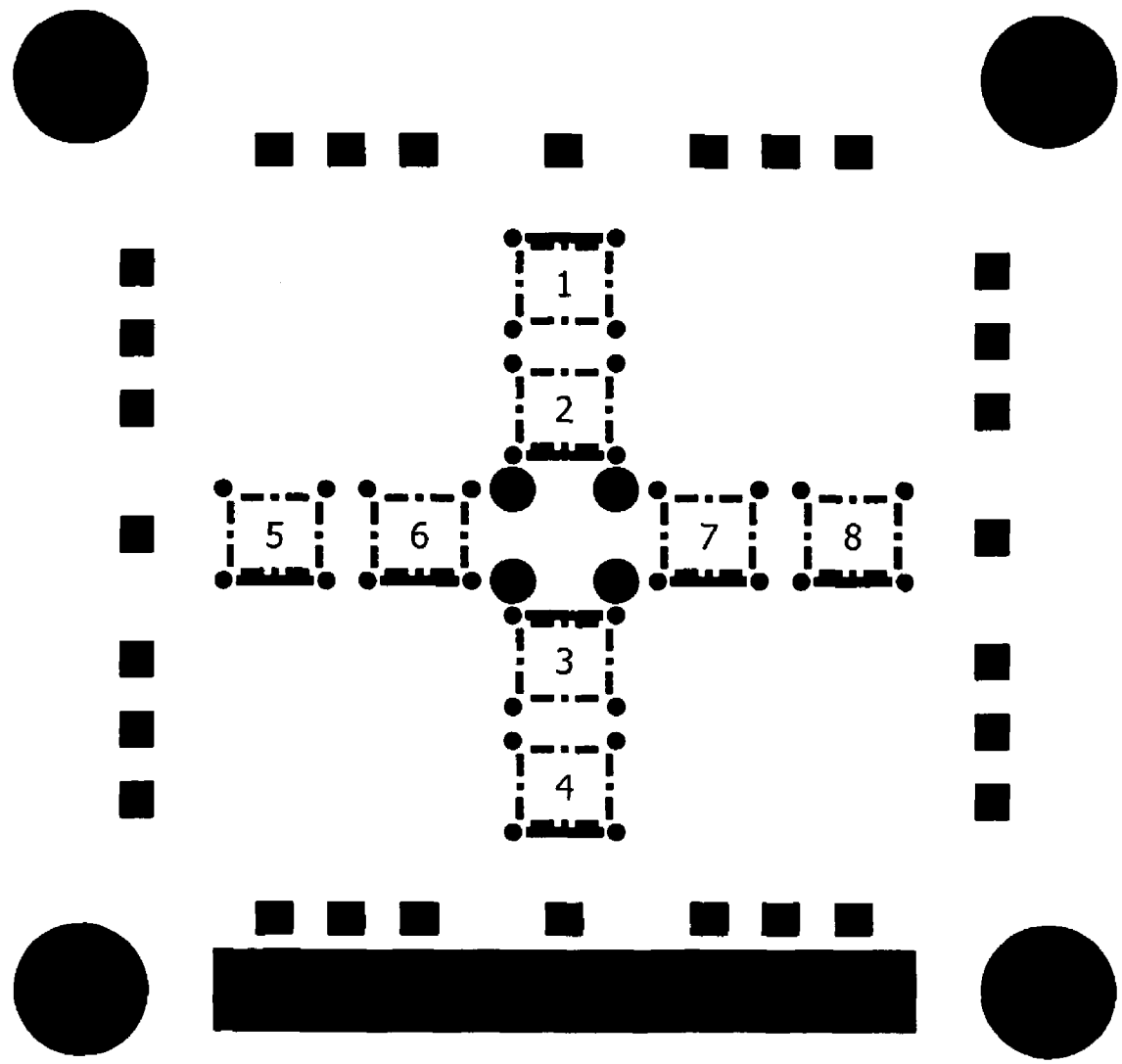
FIG. 15 is another diagram of assistance in explaining the configuration of the 2D code in FIG. 5.

Elemental 2D codes 121C included in a unit of eight between the elemental 2D codes 121B (hereinafter referred to as unit-of-eight elemental 2D codes 121C as appropriate) are given numbers corresponding to arrangement positions, as shown in FIG. 15. Thus, as shown in FIG. 13, an elemental 2D code 121C given number 1 is assigned "101" as an ID number; an elemental 2D code 121C given number 2 is assigned "201" as an ID number; an elemental 2D code 121C given number 3 is assigned "301" as an ID number; an elemental 2D code 121C given number 4 is assigned "401" as an ID number; an elemental 2D code 121C given number 5 is assigned "501" as an ID number; an elemental 2D code 121C given number 6 is assigned "601" as an ID number; an elemental 2D code 121C given number 7 is assigned "701" as an ID number; and an elemental 2D code 121C given number 8 is assigned "801" as an ID number.

That is, in this example, it is possible to know the level of an elemental 2D code 121 by the number of digits of the ID number, and know how the elemental 2D code 121 is included at which position by the numerical value of the ID number.

Figure 16:
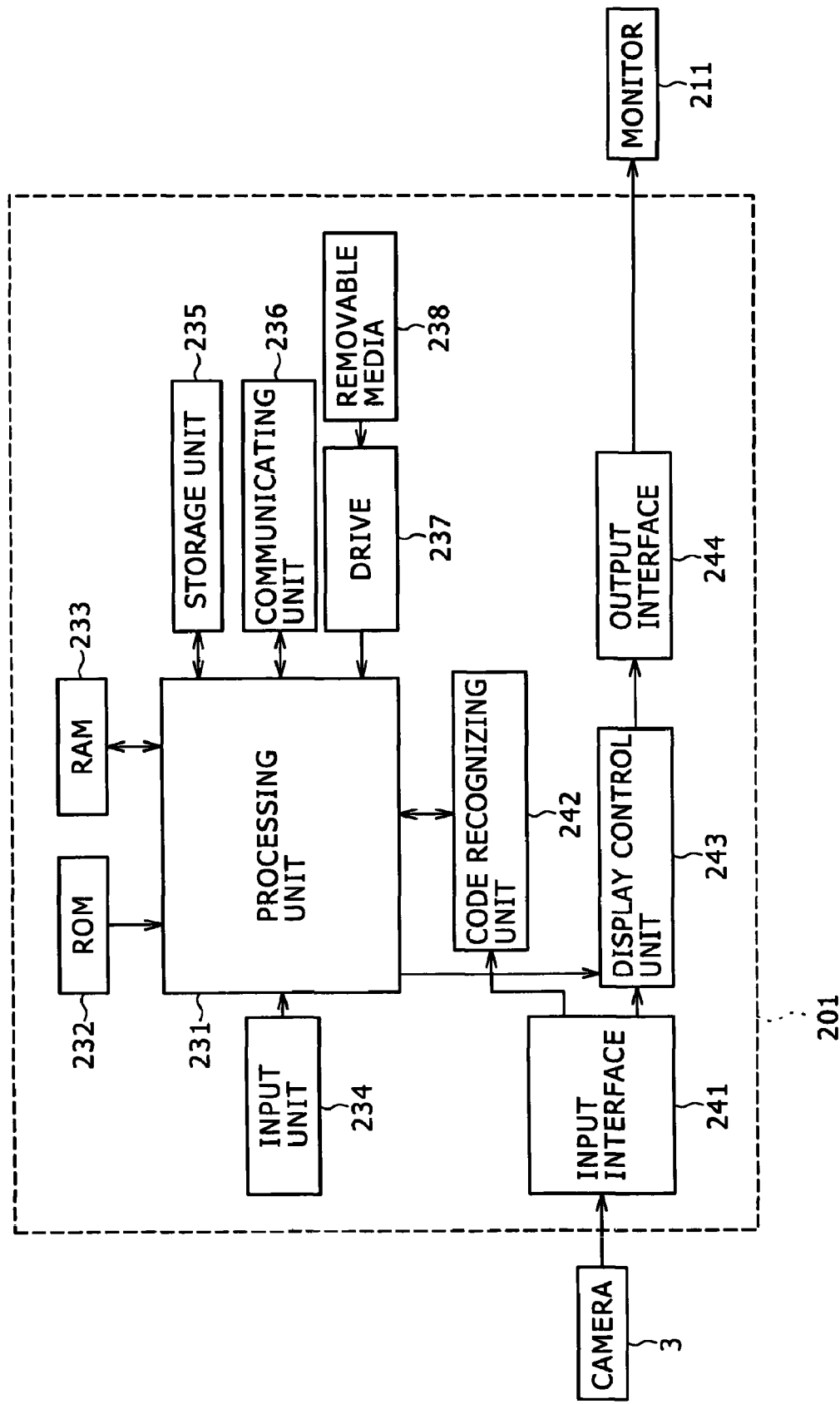
FIG. 16 is a block diagram showing an example of configuration of a personal computer in FIG. 5.

The configuration of the personal computer 201 will next be described with reference to FIG. 16.

A processing unit 231 is formed by an arithmetic unit, a control unit and the like. The processing unit 231 controls various parts using a ROM 232, a RAM 233 and the like. That is, the processing unit 231 operates as a CPU (Central Processing Unit) in the personal computer 201.

The ROM 232 is a read-only mask ROM in which data and a program are written to a circuit of the ROM at a time of manufacturing. The ROM 232 supplies the data and the program to the processing unit 231 as occasion arises. The RAM 233 is a semiconductor memory in which data can be updated. The RAM 233 temporarily retains a process (program) being executed by the processing unit 231 and data necessary for the process under control of the processing unit 231.

An input unit 234 is formed by input devices such for example as a keyboard and a mouse. The input unit 234 supplies an instruction input by an operation of the input unit 234 by a user to the processing unit 231.

A storage unit 235 is formed by a nonvolatile storage medium such for example as a hard disk. The storage unit 235 stores various information such as programs to be executed by the processing unit 231, data and the like, and supplies these pieces of information to the processing unit 231 as occasion arises.

A communicating unit 236 is controlled by the processing unit 231 to be connected to a network not shown in the figure. The communicating unit 236 communicates with another personal computer or the like not shown in the figure to send and receive information.

A drive 237 drives removable media 238 loaded into the drive 237, reads data stored on the removable media 238, and supplies the data to the processing unit 231. For example, the removable media 238 includes a magnetic disk (including flexible disks), an optical disk (including CD-ROM (Compact Disk-Read Only Memory) and DVD (Digital Versatile Disk)), a magneto-optical disk (including MD (Mini-Disk) (registered trademark)), a semiconductor memory, a hard disk and the like. The drive 237 can read a program recorded on the removable media 238 for the processing unit 231 to execute the program.

An input interface 241 is an interface for connecting an external device to the personal computer 201 by a predetermined system such for example as USB (Universal Serial Bus) or IEEE (Institute of Electrical and Electronic Engineers) 1394, and supplying information from the external device to the personal computer 201. In FIG. 16, the input interface 241 is connected to the camera 3. The input interface 241 supplies image data from the camera 3 to a code recognizing unit 242 or a display control unit 243.

The code recognizing unit 242 is controlled by the processing unit 231 to recognize the 2D code 101 from an image taken by the camera 3 which image is obtained via the input interface 241. Details of the process of recognizing the 2D code in the code recognizing unit 242 will be described later. When the code recognizing unit 242 recognizes the 2D code 101, the code recognizing unit 242 supplies a result of the recognition to the processing unit 231. The processing unit 231 performs a process on the basis of the result of the recognition.

The display control unit 243 has a buffer memory for an image which memory is not shown in the figure. The display control unit 243 performs a process related to generation of a display image to be displayed on the monitor 211. For example, the display control unit 243 is controlled by the processing unit 231 to supply the image taken by the camera 3 which image is obtained via the input interface 241 or an image supplied from the processing unit 231 to an output interface 244.

The output interface 244 is connected to the monitor 211 to supply the image data or the like from the display control unit 243 to the monitor 211.

The 2D code recognizing process of the code recognizing unit 242 will next be described with reference to a flowchart of FIG. 17.

In step S1, the value of a counter i counting the setting of a threshold value representing a predetermined luminance value is initialized to one. In this example, five threshold values are provided. The threshold value indicated at setting number 1 is the highest threshold value, and the threshold value is decreased stepwise to the threshold value indicated at setting number 5.

In step S2, image data captured by the personal computer 201 is subjected to a binarizing process on the basis of the threshold value of a setting number corresponding to the value of the counter i.

A pixel retaining a luminance value higher than the threshold value is coded into "1", and the pixel is made white on display. A pixel thus coded into "1" will hereinafter be referred to as a white pixel.

A pixel retaining a luminance value equal to or lower than the threshold value is coded into "0", and the pixel is made black on display. A pixel thus coded into "0" will hereinafter be referred to as a black pixel.

In next step S3, numbers are set to areas where black pixels are connected to each other (hereinafter referred to as black pixel connected areas) (the areas are labeled) in order from an upper left to a lower right with an area where black pixels are connected to each other as one area.

In step S4, a total number M of black pixel connected areas labeled in step S3 is obtained, and then whether the obtained total number M of black pixel connected areas is 257 or larger is determined. When M is 257 or larger, it is determined that the binarized image is not an appropriate image for a subsequent process. The process proceeds to step S5.

In step S5, whether the value of the counter i is equal to a number N (=5) of set threshold values (i=5) is determined. When the value of the counter i is not equal to five, the value of the counter i is incremented by one in step S6. The process returns to step S2. In step S2, the captured image data is subjected to the binarizing process again on the basis of a threshold value of a setting number corresponding to the value of the counter i incremented by one.

By thus setting a lower threshold value stepwise and performing the binarizing process, it is possible to reduce the number of pixels made to be black pixels, that is, black pixel connected areas.

When it is determined in step S5 that i=5, that is, when an appropriate total number M of black pixel connected areas are not generated on the basis of any of the threshold values, it is determined that the image data for one frame does not include an image of an elemental 2D code 121. Then the process is ended.

When it is determined in step S4 that the total number of black pixel connected areas is smaller than 257, the process proceeds to step S7, where a guide cell 132 is detected from the black pixel connected areas on the basis of a position and a size that the guide cell 132 (FIG. 8) should naturally have.

In step S8, whether the guide cell 132 has been detected by the process of step S7 is determined. When it is determined that the guide cell 132 has been detected, the process proceeds to step S9, where a coded cell detecting process is performed. In this process, corner cells 131 are detected from the guide cell 132, and an area where coded cells 133 are present is identified by the guide cell 132 and the corner cells 131, whereby the coded cells 133 are detected.

The process proceeds to next step S10, where whether the coded cells 133 have been detected is determined. When it is determined that the coded cells 133 have been detected, code data, that is, an ID number and image information coded in the elemental 2D code 121, and coordinates of the corner cells 131 on display (hereinafter referred to as 2D code coordinate data as appropriate) are obtained from a code map of the detected coded cells 133, and are retained in step S11. Thereafter the process is ended.

When it is determined in step S8 that the guide cell 132 has not been detected, or when it is determined in step S10 that the coded cells 133 have not been detected, it is determined that the image data subjected to the 2D code recognizing process this time does not include an elemental 2D code 121. Then the process is ended.

The 2D code recognizing process is thus performed. When an elemental 2D code 121 has been recognized, the code recognizing unit 242 supplies an ID number, image information, and 2D code coordinate data obtained as a result of the recognition to the processing unit 231. Incidentally, details of the 2D code recognizing process are described in Patent Document 1.

In the above-described 2D code recognizing process, when the largest elemental 2D code 121A (the 2D code at the first level) of the elemental 2D codes 121 forming the 2D code 101 can be recognized, elemental 2D codes 121B and elemental 2D codes 121C included within the elemental 2D code 121A may be recognized simultaneously. In the above-described recognizing process, however; the larger a black pixel connected area, the more readily the black pixel connected area is recognized as the guide cell 132. Therefore the elemental 2D code 121A is recognized.

Figure 18:
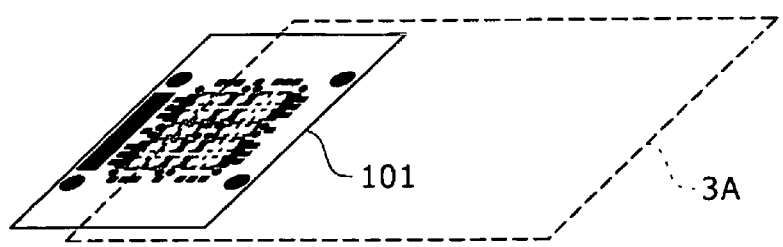
FIG. 18 is a diagram of assistance in explaining the 2D code recognizing process of FIG. 17.

As shown in FIG. 18, when only a part of the 2D code 101 is included in the image pickup area 3A, but an image of a plurality of elemental 2D codes 121 is included, the above-described recognizing process detects a guide cell 132 from an upper left with the guide cell 132 of the elemental 2D code 121A at a bottom. Thus, in the example of FIG. 18, an upper left elemental 2D code 121B in the elemental 2D code 121A is recognized among large black pixel connected areas.

A process of the processing unit 231 when an elemental 2D code 121 is recognized as described above will next be described with reference to a flowchart of FIG. 19. This process will be described with reference to the flowchart, and then concretely described with reference to FIG. 13.

When an ID number, image information, and 2D code coordinate data obtained as a result of the 2D code recognizing process are supplied from the code recognizing unit 242, the processing unit 231 in step S101 controls the display control unit 243 to set an image frame with (1, 1, 0), (1, −1, 0), (−1, 1, 0), and (−1, −1, 0) as coordinates of four corners thereof in the image buffer memory. This image frame is an image frame of an image corresponding to the elemental 2D code 121A.

In addition, the processing unit 231 reads a coded image from the storage unit 235, for example. The processing unit 231 controls the display control unit 243 to draw the coded image in an area in the reference image frame which area corresponds to a position on the 2D code 101 of the recognized elemental 2D code 121. Incidentally, the image drawn in the reference image frame will be referred to as an object image as appropriate.

In step S102, the processing unit 231 determines whether the ID number of the elemental 2D code 121 supplied from the code recognizing unit 242 is a one-digit number. When the processing unit 231 determines that the ID number of the elemental 2D code 121 is not a one-digit number, the process proceeds to step S103.

The ID number of the elemental 2D code 121A (the elemental 2D code 121 at the first level) is a one-digit number. The ID numbers of elemental 2D codes 121B (elemental 2D codes 121 at the second level) or elemental 2D codes 121C (elemental 2D codes 121 at the third level) are two-digit numbers or three-digit numbers Thus, when an elemental 2D code 121B or an elemental 2D code 121C is recognized, the process proceeds to step S103.

In step S103, the processing unit 231 determines whether the ID number is a three-digit number, and whether the numerical value of a second digit is "0". In this example, elemental 2D codes 121C (unit-of-eight elemental 2D codes 121C) arranged between the elemental 2D codes 121B have a three-digit ID number with a second digit of "0", as shown in FIG. 13. Thus, in this step, whether the recognized elemental 2D code 121 is a unit-of-eight elemental 2D code 121C is determined.

When the processing unit 231 determines in step S103 that the ID number is not a three-digit number, or that the ID number is a three-digit number but the numerical value of the second digit is not "0", that is, determines that the recognized elemental 2D code 121 is a unit-of-four elemental 2D code 121 rather than a unit-of-eight elemental 2D code 121C, the process proceeds to step S104.

In step S104, a unit-of-four elemental 2D code process is performed. Details of this process are shown in a flowchart of FIG. 20.

In step S111, the processing unit 231 determines whether the numerical value of the most significant digit of the ID number (including a number after the numerical value of the most significant digit of the ID number is removed in step S119 to be described later) is one. When the processing unit 231 determines that the numerical value of the most significant digit of the ID number is one, the process proceeds to step S112.

In step S112, the processing unit 231 controls the display control unit 243 to magnify the image (object image) drawn in the reference image frame by three times in both a vertical direction and a horizontal direction (by nine times), and rotate the image by 180 degrees. The processing unit 231 further translates the object image by (3/7, −3/7).

Incidentally, in the following, the processing unit 231 controlling the display control unit 243 to perform a predetermined process will be described as "the processing unit 231 performs a predetermined process" for simplicity.

When the processing unit 231 determines in step S111 that the numerical value of the most significant digit of the ID number is not one, the process proceeds to step S113, where the processing unit 231 determines whether the numerical value of the most significant digit of the ID number is two. When the processing unit 231 determines that the numerical value of the most significant digit of the ID number is two, the process proceeds to step S114.

In step S114, the processing unit 231 magnifies the object image by nine times, and rotates the object image by 180 degrees. The processing unit 231 further translates the object image by (−3/7, −3/7).

When the processing unit 231 determines in step S113 that the numerical value of the most significant digit is not two, the process proceeds to step S115, where the processing unit 231 determines whether the numerical value of the most significant digit of the ID number is three. When the processing unit 231 determines that the numerical value of the most significant digit of the ID number is three, the process proceeds to step S116.

In step S116, the processing unit 231 magnifies the object image by nine times. The processing unit 231 further translates the object image by (3/7, 3/7).

When the processing unit 231 determines in step S115 that the numerical value of the most significant digit is not three, the process proceeds to step S117, where the processing unit 231 determines whether the numerical value of the most significant digit of the ID number is four. When the processing unit 231 determines that the numerical value of the most significant digit of the ID number is four, the process proceeds to step S118.

In step S118, the processing unit 231 magnifies the object image by nine times. The processing unit 231 further translates the object image by (−3/7, 3/7).

After the process of step S112, step S114, step S116, or step S118, the process proceeds to step S119, where the processing unit 231 removes the numerical value of the most significant digit of the ID number.

When the processing unit 231 determines in step S117 that the numerical value of the most significant digit of the ID number is not four, or after the process of step S119, the process proceeds to step S106 in FIG. 19.

In step S106, the processing unit 231 determines whether an error has occurred. A numerical value forming the ID number of a unit-of-four elemental 2D code 121 is one to four. Thus, when the processing unit 231 determines in step S117 in FIG. 20 that the numerical value of the most significant digit of the ID number is not four, that is, when the numerical value is recognized as a number other than numbers one to four, it is determined that an error has occurred.

When the processing unit 231 determines in step S106 that no error has occurred, that is, when the process of step S119 has been performed, the process proceeds to step S107, where the processing unit 231 determines whether the ID number is a one-digit number. When the processing unit 231 determines that the ID number is not a one-digit number, the process returns to step S104 to similarly repeat the process from step S104 on down.

When the processing unit 231 determines in step S103 that the ID number is a three-digit number, and that the numerical value of the second digit is "0", that is, when the recognized elemental 2D code 121 is a unit-of-eight elemental 2D code 121C, the process proceeds to step S105, where a unit-of-eight elemental 2D code process is performed. Details of this process are shown in a flowchart of FIG. 21.

In step S131, the processing unit 231 determines whether the numerical value of the most significant digit of the ID number is one. When the processing unit 231 determines that the numerical value of the most significant digit of the ID number is one, the process proceeds to step S132.

In step S132, the processing unit 231 magnifies the object image by nine times in both a vertical direction and a horizontal direction (by 81 times), and rotates the object image by 180 degrees. The processing unit 231 further translates the object image by (0, −4/7).

When the processing unit 231 determines in step S131 that the numerical value of the most significant digit of the ID number is not one, the process proceeds to step S133, where the processing unit 231 determines whether the numerical value is two. When the processing unit 231 determines that the numerical value is two, the process proceeds to step S134.

In step S134, the processing unit 231 magnifies the object image by 81 times. The processing unit 231 further translates the object image by (0, −2/7).

When the processing unit 231 determines in step S133 that the numerical value of the most significant digit of the ID number is not two, the process proceeds to step S135, where the processing unit 231 determines whether the numerical value is three. When the processing unit 231 determines that the numerical value is three, the process proceeds to step S136.

In step S136, the processing unit 231 magnifies the object image by 81 times, and rotates the object image by 180 degrees. The processing unit 231 further translates the object image by (0, 2/7).

When the processing unit 231 determines in step S135 that the numerical value of the most significant digit of the ID number is not three, the process proceeds to step S137, where the processing unit 231 determines whether the numerical value is four. When the processing unit 231 determines that the numerical value is four, the process proceeds to step S138.

In step S138, the processing unit 231 magnifies the object image by 81 times. The processing unit 231 further translates the object image by (0, 4/7).

When the processing unit 231 determines in step S137 that the numerical value of the most significant digit of the ID number is not four, the process proceeds to step S139, where the processing unit 231 determines whether the numerical value is five. When the processing unit 231 determines that the numerical value is five, the process proceeds to step S140.

In step S140, the processing unit 231 magnifies the object image by 81 times. The processing unit 231 further translates the object image by (4/7, 0).

When the processing unit 231 determines in step S139 that the numerical value of the most significant digit of the ID number is not five, the process proceeds to step S141, where the processing unit 231 determines whether the numerical value is six. When the processing unit 231 determines that the numerical value is six, the process proceeds to step S142.

In step S142, the processing unit 231 magnifies the object image by 81 times. The processing unit 231 further translates the object image by (2/7, 0).

When the processing unit 231 determines in step S141 that the numerical value of the most significant digit of the ID number is not six, the process proceeds to step S143, where the processing unit 231 determines whether the numerical value is seven. When the processing unit 231 determines that the numerical value is seven, the process proceeds to step S144.

In step S144, the processing unit 231 magnifies the object image by 81 times. The processing unit 231 further translates the object image by (−2/7, 0).

When the processing unit 231 determines in step S143 that the numerical value of the most significant digit of the ID number is not seven, the process proceeds to step S145, where the processing unit 231 determines whether the numerical value is eight. When the processing unit 231 determines that the numerical value is eight, the process proceeds to step S146.

In step S146, the processing unit 231 magnifies the object image by 81 times. The processing unit 231 further translates the object image by (−4/7, 0).

After the process of step S132, step S134, step S136, step S138, step S140, step S142, step S144, or step S146, the process proceeds to step S147, where the processing unit 231 removes the numerical values (two numerical values) of the most significant digit and the next most significant digit of the ID number.

When the processing unit 231 determines in the process of step S145 that the numerical value of the most significant digit of the ID number is not eight, or after the process of step S147, the process proceeds to step S106 in FIG. 19.

In step S106, the processing unit 231 determines whether an error has occurred. A numerical value forming the ID number of a unit-of-eight elemental 2D code 121C is one to eight. Thus, when the processing unit 231 determines in step S145 that the numerical value of the most significant digit of the ID number is not eight, that is, when the numerical value is recognized as a number other than numbers one to eight, it is determined that an error has occurred.

When the processing unit 231 determines in step S106 that no error has occurred, that is, when the process of step S147 has been performed in this case, the process proceeds to step S107, where whether the ID number is a one-digit number is determined. In this case, the process of step S147 removes the two numerical values from the three-digit ID number of the unit-of-eight elemental 2D code 121C. Therefore, the ID number becomes a one-digit number. Thus a result of the determination in the process of step S107 is YES.

Figure 21:
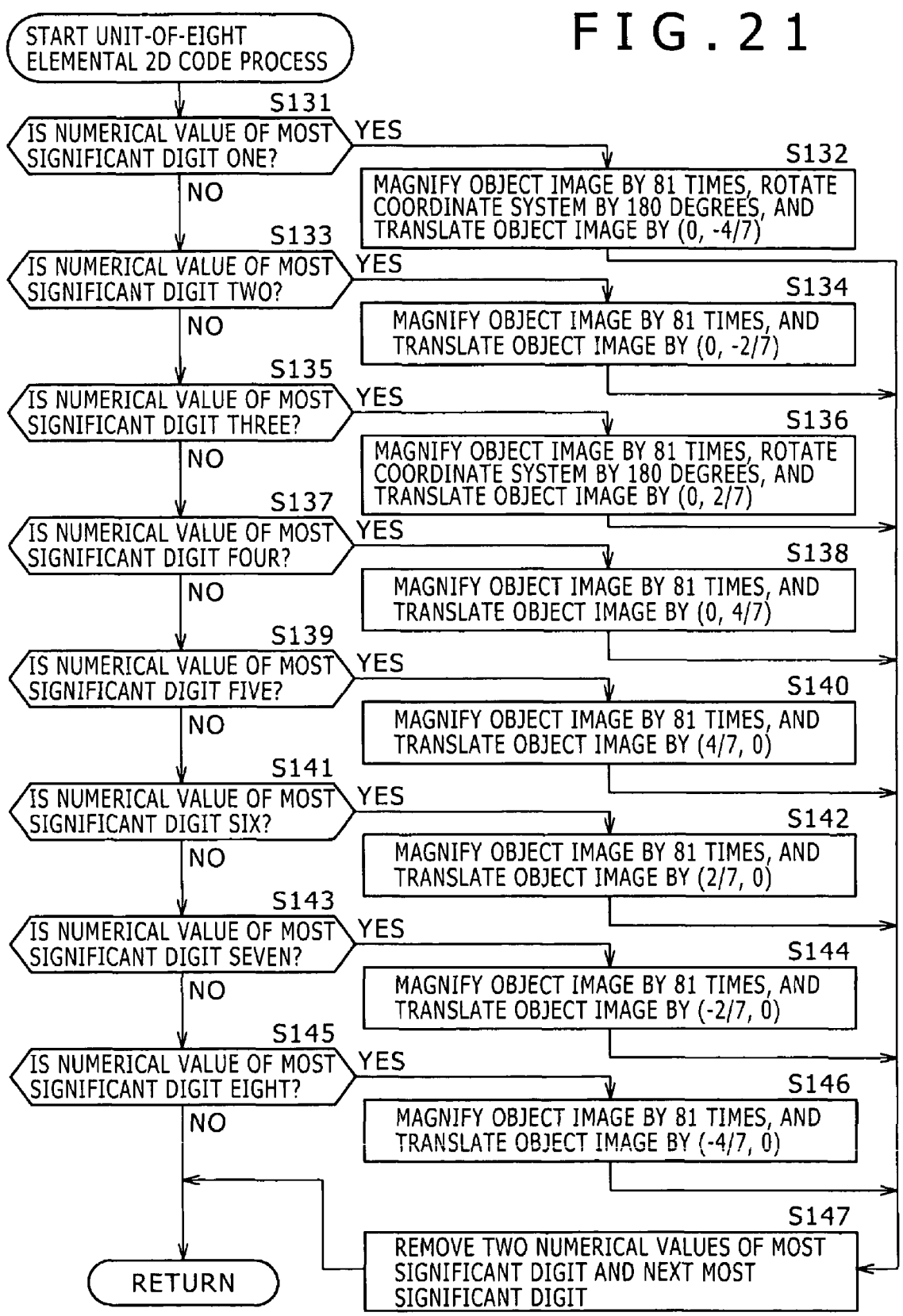
FIG. 21 is a flowchart of assistance in explaining details of a process of step S105 in FIG. 19.

When the processing unit 231 determines in step S102 that the ID number is a one-digit number, that is, when the elemental 2D code 121A is recognized, or when the processing unit 231 determines in step S107 that the ID number is a one-digit number (when the ID number becomes a one-digit number after numerical values forming the ID number are removed in the process of step S119 in FIG. 20 or the process of step S147 in FIG. 21), the process proceeds to step S108.

Figure 17:
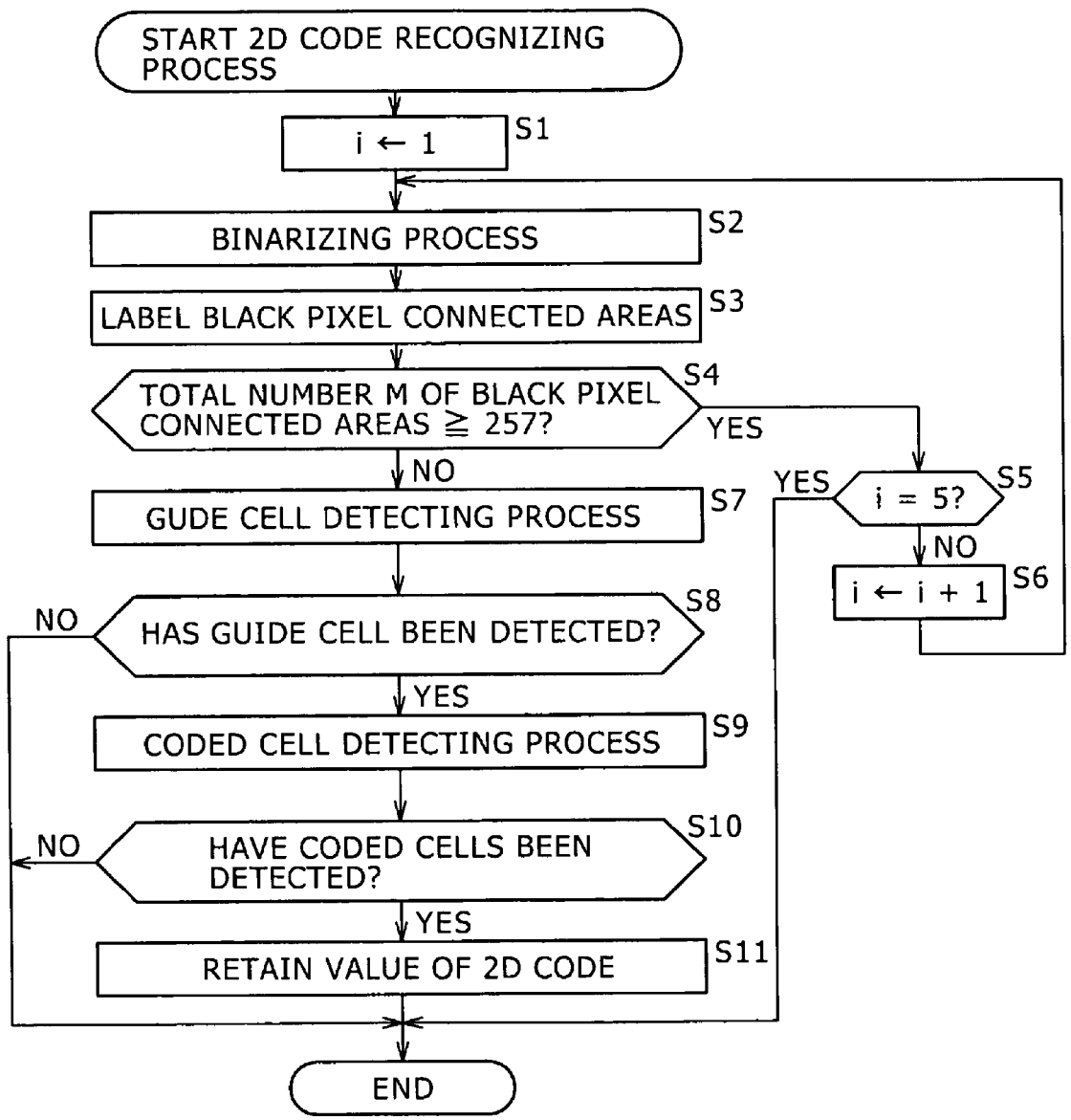
FIG. 17 is a flowchart of assistance in explaining a 2D code recognizing process.

In step S108, the processing unit 231 controls the display control unit 243 to display the object image (coded image pasted to the whole area in the reference image frame) on the monitor 211 such that the area in the reference image frame of the elemental 2D code 121 recognized in this case corresponds to an area on display which area is based on the 2D code coordinate data of the elemental 2D code 121 (step S11 in FIG. 17). Then the process is ended.

When the processing unit 231 determines in step S106 that an error has occurred, the process is ended without a coded image being displayed.

The above-described process of the processing unit 231 will next be described concretely with reference to FIG. 13.

Figure 22A:
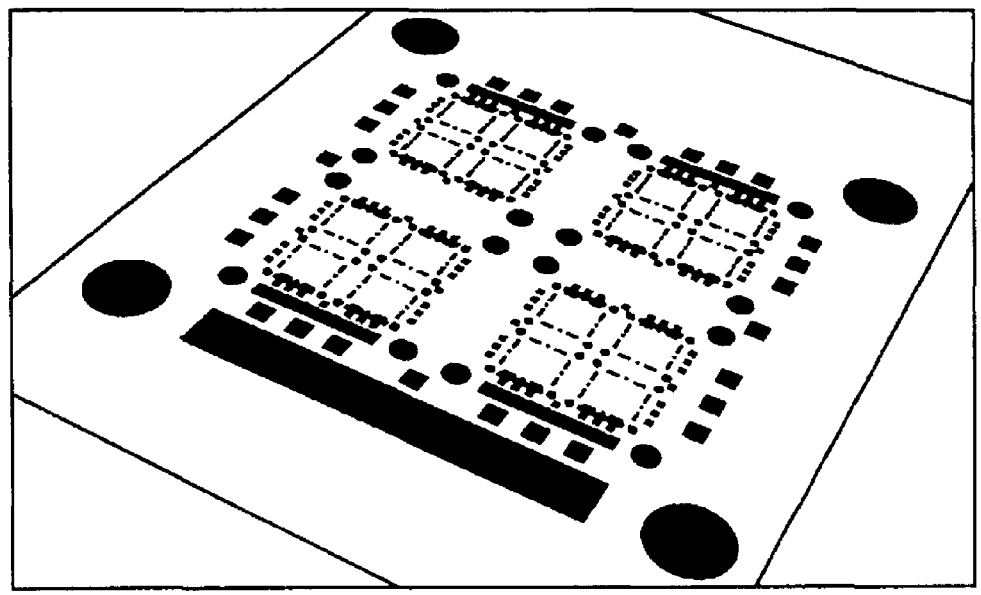
FIGS. 22A and 22B are diagrams showing a result of the process of FIG. 19.

Description will first be made of a case where the elemental 2D code 121A is recognized. When for example image data including the whole of the 2D code 101 is supplied from the camera 3, and thus the whole of the 2D code 101 can be displayed as shown in FIG. 22A, the elemental 2D code 121A is recognized. The coded image is read from the storage unit 235, for example, and is drawn in an area in the reference image frame which area corresponds to an area of the elemental 2D code 121A on the 2D code 101 (that is, in the entire area of the reference image frame) (step S101 in FIG. 19).

Figure 22B:
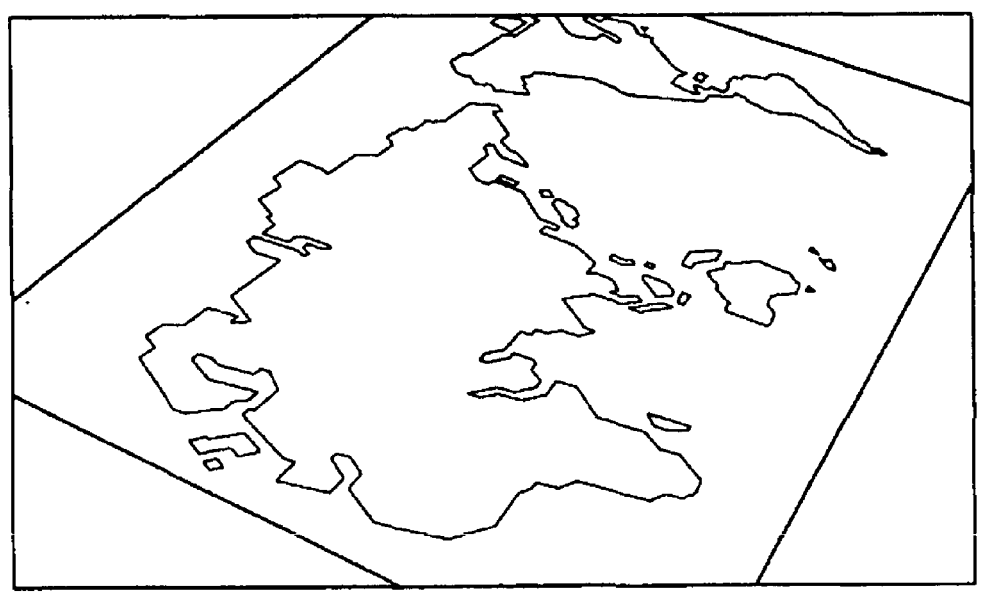

The ID number of the elemental 2D code 121A is "1". Therefore the process proceeds to step S108, where the image drawn in the reference image frame (object image) is displayed in an area on display which area corresponds to the 2D code coordinate data of the elemental 2D code 121A. That is, as shown in FIG. 22B, the whole of the coded image (image of a world map) is displayed.

Description will next be made of a case where an elemental 2D code 121B is recognized. When for example an elemental 2D code 121B disposed on an upper left side within the elemental 2D code 121A is recognized, the coded image is read from the storage unit 235, for example, and is drawn in an area in the reference image frame which area corresponds to an area of the elemental 2D code 121B on the 2D code 101 (that is, in an upper left area in the reference image frame) (step S101).

The ID number of the elemental 2D code 121B is "11" (step S102 and step S103 in FIG. 19). Because the numerical value of the most significant digit of the ID number is one, the process proceeds to step S112 in FIG. 20, where the above-described process is performed.

The size of the elemental 2D code 121B on the 2D code 101 is ⅓ of the size of the elemental 2D code 121A. In addition, the vertical orientation of the elemental 2D code 121B is opposite to that of the elemental 2D code 121A (the elemental 2D code 121B is disposed in a state of being rotated by 180 degrees with the guide cell 132 facing upward). Further, the object image now drawn in the reference image frame is situated at a position shifted by (−3/7, 3/7) from the center of the reference image frame (center of the elemental 2D code 121A).

Thus, in step S112, the object image is magnified by nine times, rotated by 180 degrees, and translated by (3/7, −3/7), whereby the coded image is pasted to the whole area in the reference image frame (an image displayed in the area on display of the elemental 2D code 121A is obtained).

When an elemental 2D code 121B disposed on an upper right side within the elemental 2D code 121A is recognized, the coded image is read from the storage unit 235, and is drawn in an area in the reference image frame which area corresponds to an area of the elemental 2D code 121B on the 2D code 101 (that is, in an upper right area) (step S101).

The ID number of the elemental 2D code 121B disposed on the upper right side within the elemental 2D code 121A is "21" (step S102 and step S103 in FIG. 19). Because the numerical value of the most significant digit of the ID number is two, the process proceeds to step S114 in FIG. 20, where the above-described process is performed.

The size of the elemental 2D code 121B on the 2D code 101 is ⅓ of the size of the elemental 2D code 121A. In addition, the vertical orientation of the elemental 2D code 121B is opposite to that of the elemental 2D code 121A. Further, the object image now drawn in the reference image frame is situated at a position shifted by (3/7, 3/7) from the center of the reference image frame.

Thus, in step S114, the object image is magnified by nine times, rotated by 180 degrees, and translated by (−3/7, −3/7), whereby the coded image is pasted to the whole area in the reference image frame.

When an elemental 2D code 121B disposed on a lower left side within the elemental 2D code 121A is recognized, the coded image is read from the storage unit 235, and is drawn in an area in the reference image frame which area corresponds to an area of the elemental 2D code 121B on the 2D code 101 (that is, in a lower left area) (step S101).

The ID number of the elemental 2D code 121B disposed on the lower left side within the elemental 2D code 121A is "31". Because the numerical value of the most significant digit of the ID number is three, the process proceeds to step S116 in FIG. 20, where the above-described process is performed.

The Size of the elemental 2D code 121B on the 2D code 101 is ⅓ of the size of the elemental 2D code 121A. In addition, the vertical orientation of the elemental 2D code 121B is the same as that of the elemental 2D code 121A (the elemental 2D code 121B is disposed such that the guide cell 132 faces downward). Further, the object image now drawn in the reference image frame is situated at a position shifted by (−3/7, −3/7) from the center of the reference image frame.

Thus, in step S116, the object image is magnified by nine times, and translated by (3/7, 3/7), whereby the coded image is pasted to the whole area in the reference image frame.

When an elemental 2D code 121B disposed on a lower right side within the elemental 2D code 121A is recognized, the coded image is read from the storage unit 235, and is drawn in an area in the reference image frame which area corresponds to an area of the elemental 2D code 121B on the 2D code 101 (that is, in a lower right area) (step S101).

The ID number of the elemental 2D code 121B disposed on the lower right side within the elemental 2D code 121A is "41". Because the numerical value of the most significant digit of the ID number is four, the process proceeds to step S118 in FIG. 20, where the above-described process is performed.

The size of the elemental 2D code 121B on the 2D code 101 is ⅓ of the size of the elemental 2D code 121A. In addition, the vertical orientation of the elemental 2D code 121B is the same as that of the elemental 2D code 121A. Further, the object image now drawn in the reference image frame is situated at a position shifted by (3/7, −3/7) from the center of the reference image frame.

Thus, in step S118, the object image is magnified by nine times, and translated by (−3/7, 3/7), whereby the coded image is pasted to the whole area in the reference image frame.

After the coded image is processed as described above according to the recognized elemental 2D code 121B, the numerical value of the most significant digit of the ID number is removed from the two-digit ID number (step S119 in FIG. 20). Therefore a result of the determination made in step S107 in FIG. 19 is YES. In step S108, the object image is displayed such that the area of the elemental 2D code 121B in the reference image frame corresponds to an area on display which area is based on the 2D code coordinate data of the elemental 2D code 121B.

Figure 23A:
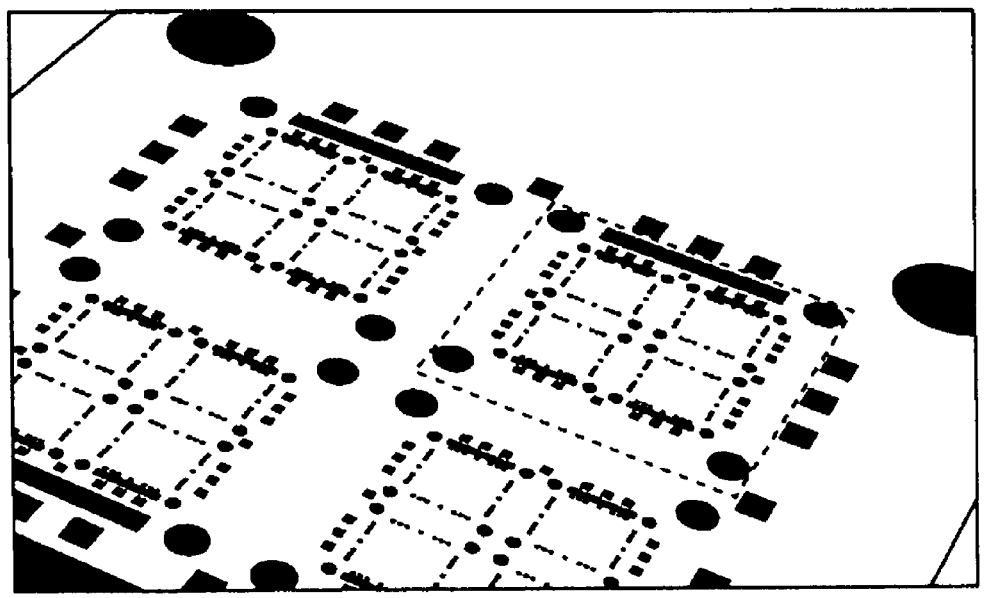
FIGS. 23A and 23B are other diagrams showing a result of the process of FIG. 19.
Figure 23B:

In a case where for example image data including the elemental 2D code 121B on the upper right side of the elemental 2D code 121A is supplied from the camera 3 and the elemental 2D code 121B (enclosed by a dotted line in FIG. 23A) can be displayed as shown in FIG. 23A, when the elemental 2D code 121B is recognized, a part of the image (coded image) of the world map is displayed in such a manner as to correspond to the area on display of the elemental 2D code 121B, as shown in FIG. 23B.

Figure 24A:
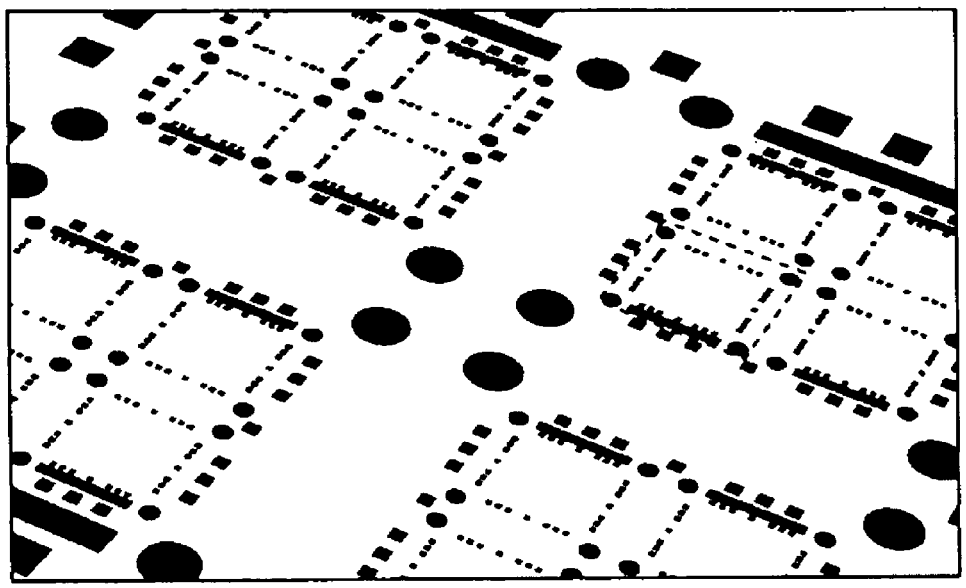
FIGS. 24A and 24B are other diagrams showing a result of the process of FIG. 19.

Description will next be made of a case where a unit-of-four elemental 2D code 121C is recognized. In a case where for example image data including an elemental 2D code 121C (enclosed by a dotted line in FIG. 24A) disposed on the lower left side of the elemental 2D code 121B disposed on the upper right side of the elemental 2D code 121A as shown in FIG. 24A is supplied from the camera 3 and the elemental 2D code 121C can be displayed as shown in FIG. 24A, when the elemental 2D code 121C is recognized, the coded image is read from the storage unit 235, for example, and is drawn in an area in the reference image frame which area corresponds to an area of the elemental 2D code 121C on the 2D code 101 (step S101).

The ID number of the elemental 2D code 121C is "321" (step S102 and step 103 in FIG. 19). Because the numerical value of the most significant digit of the ID number is three, the process proceeds to step S116 in FIG. 20, where the above-described process is performed.

The size of the elemental 2D code 121C on the 2D code 101 is 1/9 of the size of the elemental 2D code 121B. In addition, the vertical orientation of the elemental 2D code 121C is the same as that of the elemental 2D code 121A (the elemental 2D code 121A is disposed such that the guide cell 132 faces downward). Further, the object image drawn in the reference image frame is situated at a position shifted by (−3/7, −3/7) from the center of the elemental 2D code 121B to which the elemental 2D code 121C belongs in the reference image frame.

Thus, in step S116, the object image is magnified by nine times, and translated by (3/7, 3/7), whereby the object image of the same size at the same position as in a case where the elemental 2D code 121B (the elemental 2D code 121B on the upper right side of the elemental 2D code 121A) to which the elemental 2D code 121C belongs is obtained.

Thereafter, in this case, the numerical value "3" of the third digit as the most significant digit is removed from the ID number "321" in step S119 in FIG. 20. The process proceeds to step S107 in FIG. 19. Because an ID number "21" obtained as a result of removing the numerical value "3" of the third digit is not a one-digit number, the process of step S114 in FIG. 20 in step S104 is performed.

As described above, the elemental 2D code 121B (the elemental 2D code 121B on the upper right side of the elemental 2D code 121A) to which the elemental 2D code 121C belongs has 1/9 of the size of the elemental 2D code 121A, has a vertical orientation opposite to that of the elemental 2D code 121A, and is situated at a position shifted by (3/7, 3/7) from the center of the reference image frame. As a result of the process of step S114, the coded image is pasted to the whole area in the reference image frame (an image displayed in the area on display of the elemental 2D code 121A is obtained).

Thereafter, when "2" is removed from "21" in step S119 in FIG. 20, the ID number becomes "1". Thus the process proceeds to step S108 via step S107 in FIG. 19, where the object image pasted to the whole area in the reference image frame is displayed.

Figure 24B:
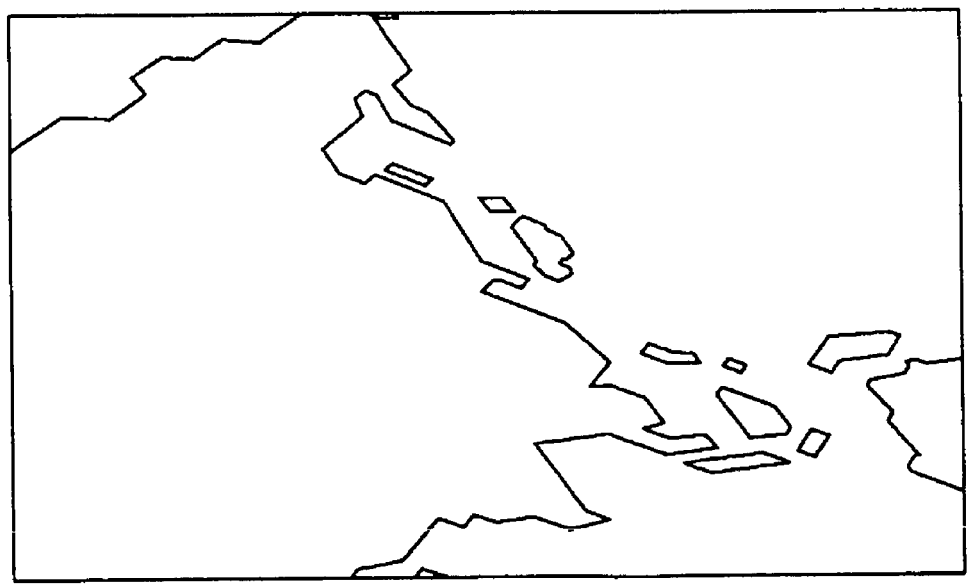

That is, in this case, as shown in FIG. 24B, a part of the image of the world map is displayed in such a manner as to correspond to the area on display of the elemental 2D code 121B disposed on the upper right side of the elemental 2D code 121A.

The unit-of-eight elemental 2D codes 121C are basically converted in a similar manner, pasted to the image frame set in step S101 in FIG. 19, and then displayed.

Incidentally, while in the above, the same image is associated with each elemental 2D code 121, different images can be associated with elemental 2D codes 121.

Figure 25:
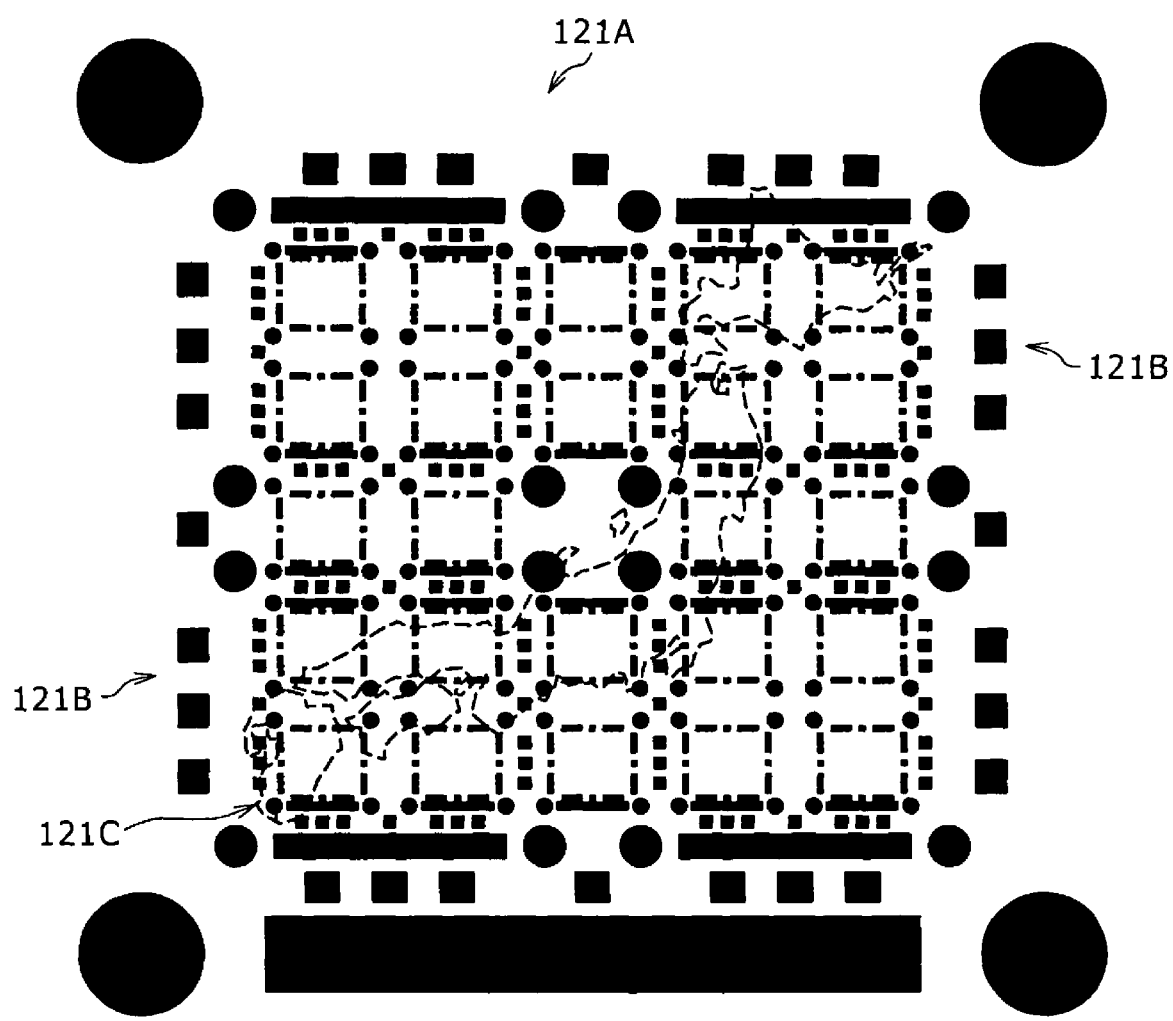
FIG. 25 is a diagram showing another example of the 2D code.
Figure 26:
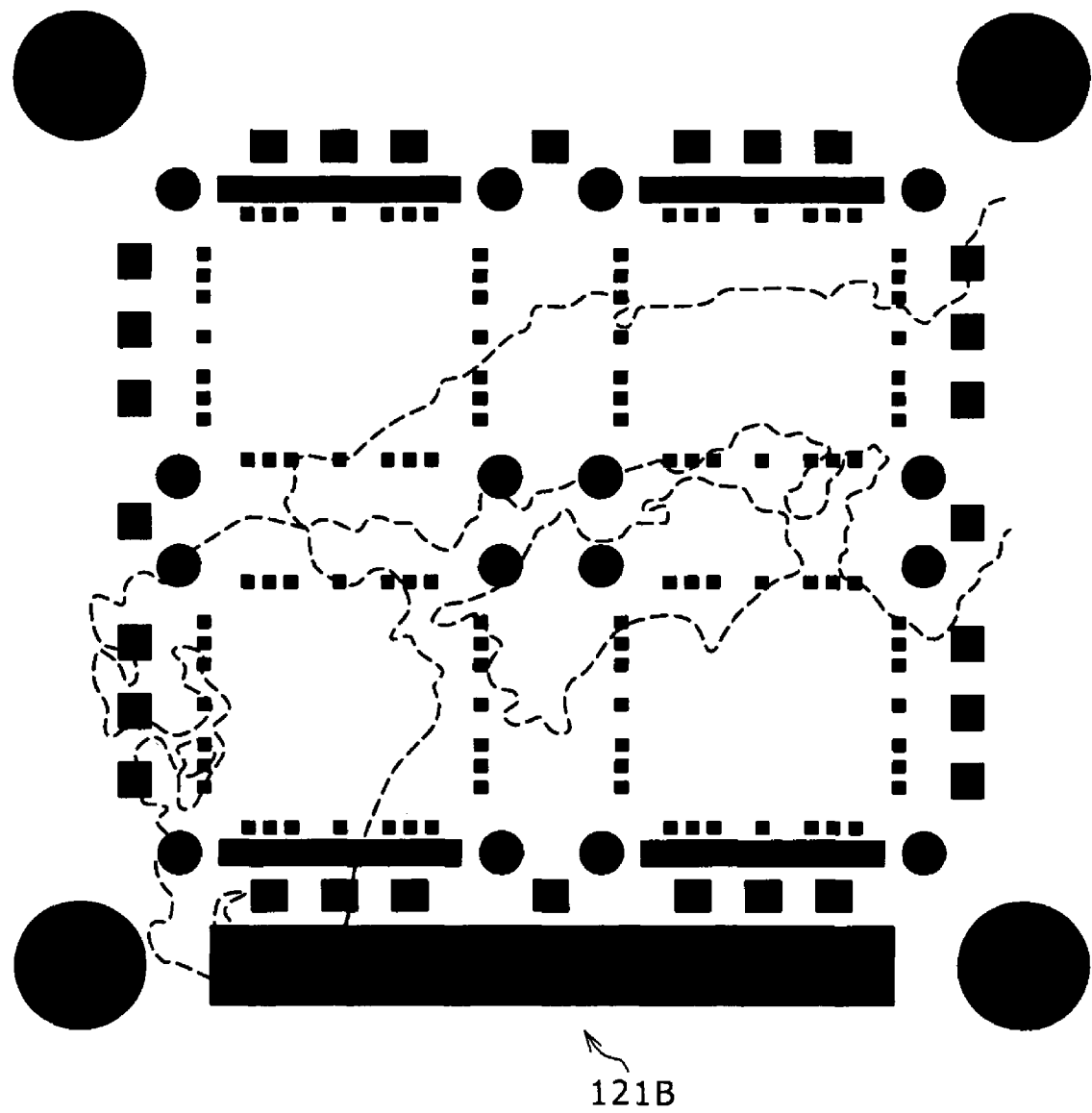
FIG. 26 is a diagram of assistance in explaining the 2D code in FIG. 25.
Figure 27:
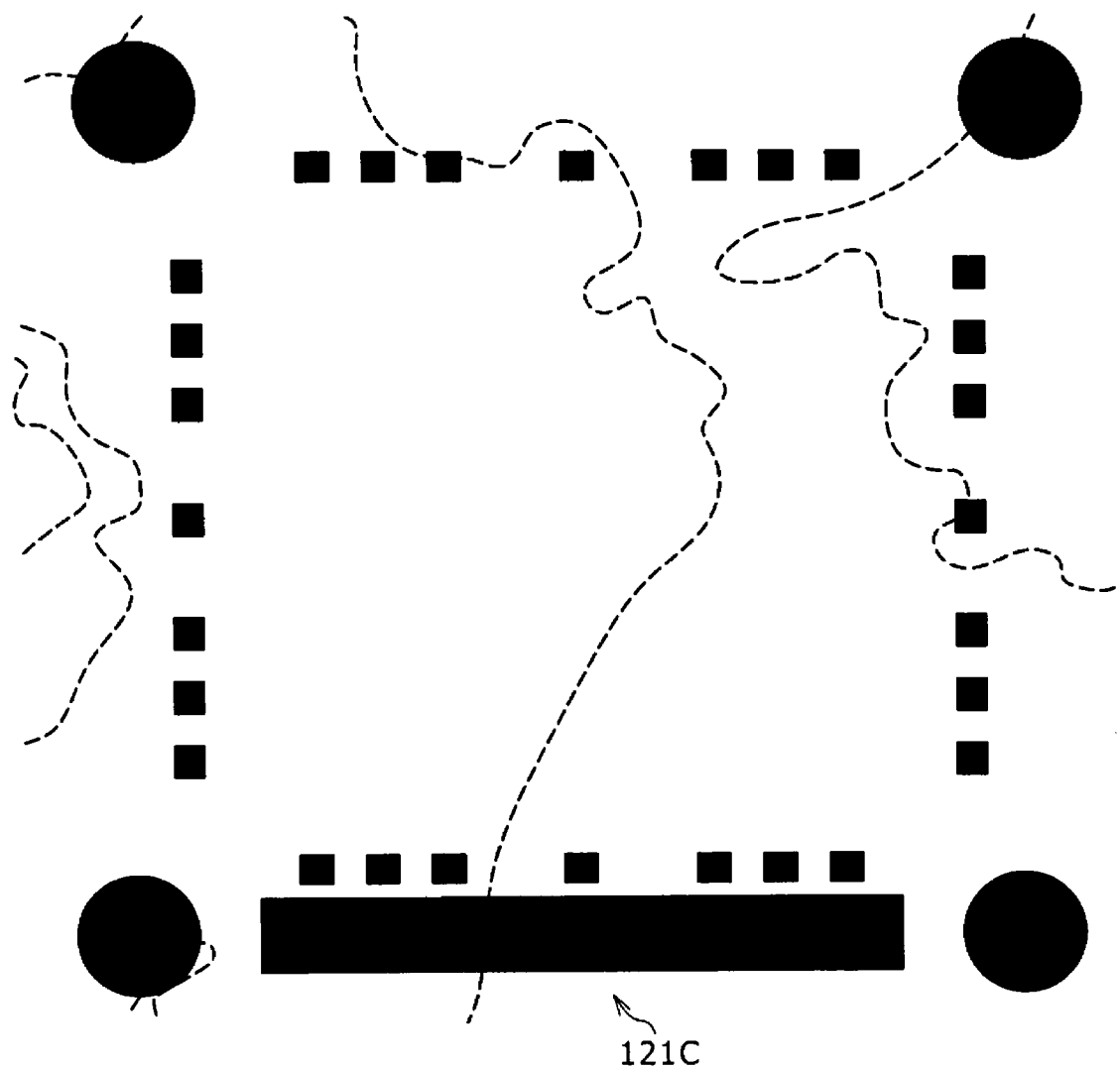
FIG. 27 is another diagram of assistance in explaining the 2D code in FIG. 25.
Figure 28:
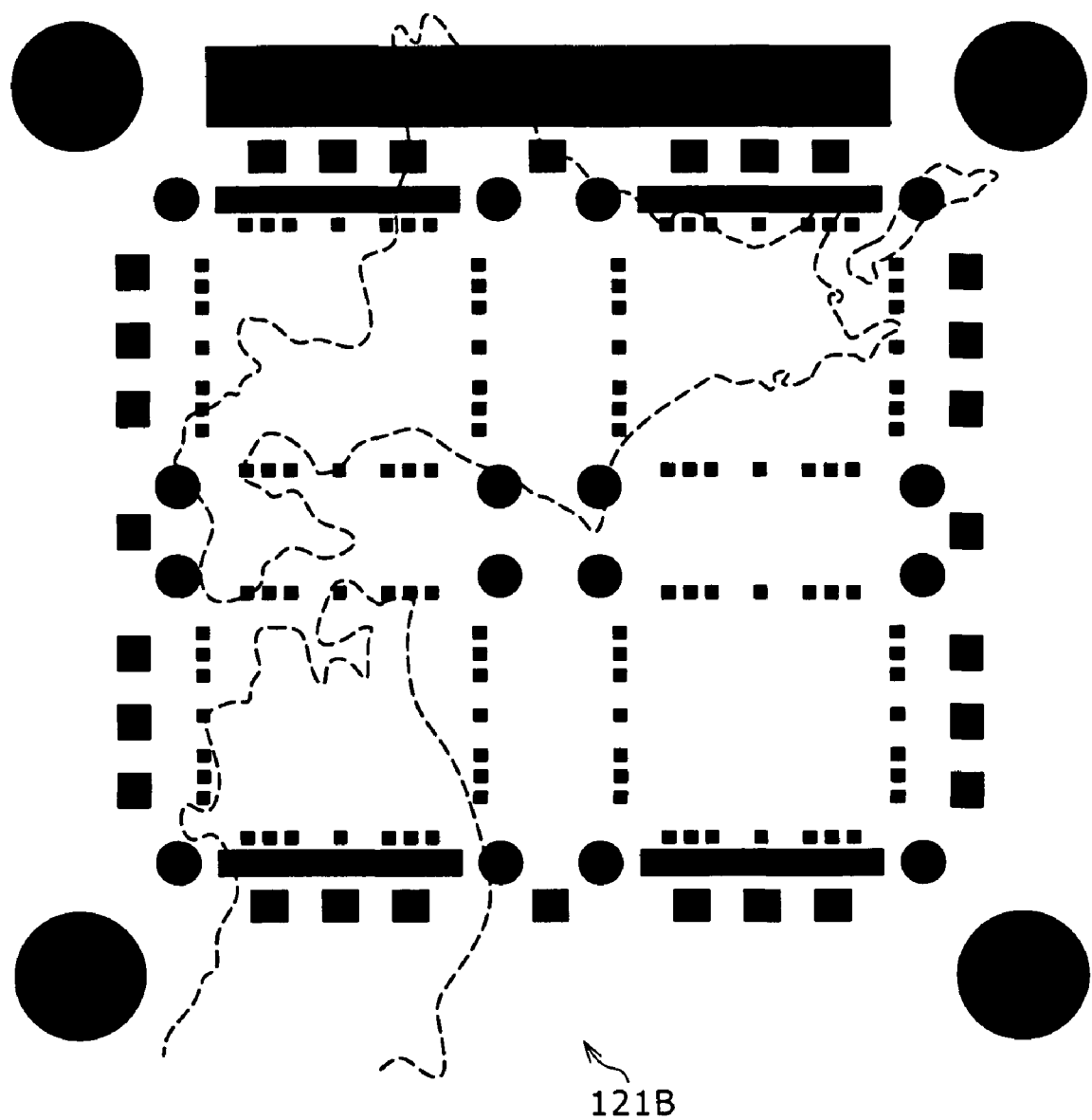
FIG. 28 is another diagram of assistance in explaining the 2D code in FIG. 25.

The elemental 2D codes 121 can be associated with images of respective parts of a map of Japan, as shown in FIG. 25, for example. Specifically, for example, the elemental 2D code 121A is associated with an image of the entire map of Japan; the elemental 2D code 121B on the lower left side within the elemental 2D code 121A is associated with an image shown in FIG. 26; the elemental 2D code 121C on the lower left side of that elemental 2D code 121B is associated with an image shown in FIG. 27; and the elemental 2D code 121B on the upper right side of the elemental 2D code 121A is associated with an image shown in FIG. 28.

In addition, not only images but also audio and character information can be associated.

The series of processes described above can be carried out not only by hardware but also by software. When the series of processes is to be carried out by software, a program constituting the software is installed from a program recording medium onto a computer incorporated in special hardware, or for example a general-purpose personal computer that can perform various functions by installing various programs thereon.

The program recording medium includes removable media as packaged media including a magnetic disk (including flexible disks), an optical disk (including CD-ROM (Compact Disc-Read Only Memory) and DVD (Digital Versatile Disc)), a magneto-optical disk (including MD (Mini-Disc) (registered trademark)), a semiconductor memory and the like, or includes the ROM, the hard disk, and the like where the program is recorded temporarily or permanently. As occasion arises, the storing of the program on the program recording medium is performed via an interface such as a router, a modem or the like using a wire or wireless communication medium such as a local area network, the Internet, digital satellite broadcasting or the like.

What is claimed is:

1. A two-dimensional bar code recognizable by an information processing device,
    wherein elemental two-dimensional bar codes, in which predetermined information is coded by two-dimensionally arranging a plurality of cells according to a predetermined arrangement rule, form a nested structure of at least three nesting levels including (1) a first level of one first elemental two-dimensional bar code of a first size, (2) a second level of four second elemental two-dimensional bar codes of a second size smaller than the first size located inside the first elemental two-dimensional bar code, and (3) a third level of a third elemental two-dimensional bar code of a third size smaller than the second size, wherein four third elemental bar codes are located inside each second elemental two-dimensional bar code.

2. The two-dimensional bar code as claimed in claim 1, wherein said second and third elemental two-dimensional bar codes are arranged in a plural unit according to a predetermined rule at each level of said nested structure.

3. The two-dimensional bar code as claimed in claim 2, wherein said predetermined rule is same at each level.

4. The two-dimensional bar code as claimed in claim 3, wherein identifying information corresponding to a level and an arrangement position in said nested structure and information corresponding to a predetermined process are coded in each of said elemental two-dimensional bar codes.

5. The two-dimensional bar code as claimed in claim 2, wherein each said elemental two-dimensional bar code includes corner cells, a guide cell, and coded cells in which said predetermined information is coded, said coded cells being arranged in an area identified by said corner cells and said guide cell, and said second elemental two-dimensional bar codes are included within an area identified by said corner cells of said first elemental two-dimensional bar code, said guide cell, or said corner cells.

6. The two-dimensional bar code as claimed in claim 5, wherein said corner cells are circular cells, and are arranged at corners of a square of a predetermined size.

7. An information processing device for recognizing a two-dimensional bar code in which elemental two-dimensional bar codes, having predetermined information coded by two-dimensionally arranging a plurality of cells according to a predetermined arrangement rule, form a nested structure of at least three nesting levels including (1) a first level of one first elemental two-dimensional bar code of a first size, (2) a second level of four second elemental two-dimensional bar codes of a second size smaller than the first size located inside the first elemental two-dimensional bar code, and (3) a third level of a third elemental two-dimensional bar code of a third size smaller than the second size, wherein four third elemental bar codes are located inside each second elemental two-dimensional bar code, said information processing device comprising:

recognizing means for recognizing said elemental two-dimensional bar code;

obtaining means for obtaining identifying information and process information coded in said elemental two-dimensional bar code recognized by said recognizing means, said identifying information being assigned in correspondence with a nested level and an arrangement position in said nested structure; and performing means for performing a process based on said process information according to said identifying information.

8. The information processing device as claimed in claim 7, wherein said performing means changes one of a size, an orientation, and a position of an image associated with said elemental two-dimensional bar code on a basis of the identifying information of said elemental two-dimensional bar code, and displays the image.

9. An information processing method for recognizing a two-dimensional bar code in which elemental two-dimensional bar codes, having predetermined information coded by two-dimensionally arranging a plurality of cells according to a predetermined arrangement rule, form a nested structure of at least three nesting levels including (1) a first level of one first elemental two-dimensional bar code of a first size, (2) a second level of four second elemental two-dimensional bar codes of a second size smaller than the first size located inside the first elemental two-dimensional bar code, and (3) a third level of a third elemental two-dimensional bar code of a third size smaller than the second size, wherein four third elemental bar codes are located inside each second elemental two-dimensional bar code, said information processing method comprising the steps of:

recognizing a said elemental two-dimensional bar code;

obtaining identifying information and process information coded in said elemental two-dimensional bar code recognized by a process of said recognizing step, the identifying information being assigned in correspondence with a nested level and an arrangement position in said nested structure; and performing a process based on said process information according to said identifying information.

10. A program for making a computer perform information processing for recognizing a two-dimensional bar code in which elemental two-dimensional bar codes, having predetermined information coded by two-dimensionally arranging a plurality of cells according to a predetermined arrangement rule, form a nested structure of at least three nesting levels including (1) a first level of one first elemental two-dimensional bar code of a first size, (2) a second level of four second elemental two-dimensional bar codes of a second size smaller than the first size located inside the first elemental two-dimensional bar code, and (3) a third level of a third elemental two-dimensional bar code of a third size smaller than the second size, wherein four third elemental bar codes are located inside each second elemental two-dimensional bar code, said program comprising the steps of:

recognizing a said elemental two-dimensional bar code;

obtaining identifying information and process information coded in said elemental two-dimensional bar code recognized by a process of said recognizing step, the identifying information being assigned in correspondence with a nested level and an arrangement position in said nested structure; and performing a process based on said process information according to said identifying information.

11. An information processing device for recognizing a two-dimensional bar code in which elemental two-dimensional bar codes, having predetermined information coded by two-dimensionally arranging a plurality of cells according to a predetermined arrangement rule, form a nested structure of at least three nesting levels including (1) a first level of one first elemental two-dimensional bar code of a first size, (2) a second level of four second elemental two-dimensional bar codes of a second size smaller than the first size located inside the first elemental two-dimensional bar code, and (3) a third level of a third elemental two-dimensional bar code of a third size smaller than the second size, wherein four third elemental bar codes are located inside each second elemental two-dimensional bar code, said information processing device comprising:

a recognizing section configured to recognize a said elemental two-dimensional bar code;

an obtaining section configured to obtain identifying information and process information coded in said elemental two-dimensional bar code recognized by said recognizing section, said identifying information being assigned in correspondence with a nested level and an arrangement position in said nested structure; and a performing section configured to perform a process based on said process information according to said identifying information.

\* \* \* \* \*